US008358754B2

(12) United States Patent
Uy et al.

(10) Patent No.: US 8,358,754 B2
(45) Date of Patent: Jan. 22, 2013

(54) METHODS, APPARATUS AND COMPUTER-READABLE MEDIA FOR PROVIDING A NETWORK-BASED CALL PARK FEATURE

(75) Inventors: Myra Uy, Scarborough (CA); David William Clark, Carp (CA)

(73) Assignee: BCE Inc., Verdun, Quebec (CA)

( * ) Notice: Subject to any disclaimer, the term of this patent is extended or adjusted under 35 U.S.C. 154(b) by 1301 days.

(21) Appl. No.: 12/092,389

(22) PCT Filed: Apr. 18, 2007

(86) PCT No.: PCT/CA2007/000639
§ 371 (c)(1),
(2), (4) Date: May 1, 2008

(87) PCT Pub. No.: WO2008/128313
PCT Pub. Date: Oct. 30, 2008

(65) Prior Publication Data
US 2010/0183127 A1 Jul. 22, 2010

(51) Int. Cl.
*H04M 1/64* (2006.01)
*H04L 12/28* (2006.01)
*G06F 17/30* (2006.01)

(52) U.S. Cl. ............... 379/88.22; 370/352; 370/356; 370/389; 370/395.5; 370/462; 379/211.01; 379/211.02; 379/265.02; 455/414.1; 455/436; 455/439; 705/37; 705/51; 707/803; 709/223; 709/229; 726/28

(58) Field of Classification Search ............ 370/351, 370/352, 356, 389, 395.1, 395.5, 462; 379/88.22, 379/207.03, 211.01, 211.02, 265.02; 455/414.1, 455/436, 439; 705/37, 51; 707/803; 709/223, 709/229; 726/28
See application file for complete search history.

(56) References Cited

U.S. PATENT DOCUMENTS 5,754,627 A * 5/1998 Butler et al. ............ 455/414.1
5,913,166 A * 6/1999 Buttitta et al. ............ 455/436
(Continued)

FOREIGN PATENT DOCUMENTS

JP 2006/174112 A 6/2006
WO WO/2004/107721 12/2004
(Continued)

OTHER PUBLICATIONS

Examiner's report issued on Feb. 7, 2012 in connection with Canadian Patent Application 2,628,402, 3 pages.

*Primary Examiner* — Gerald Gauthier

(57) ABSTRACT

A method, which comprises receiving an indication of an intent to communicate using a first communication client registered to a user account. A memory is then consulted in an attempt to identify a communication session previously established with a party that is a communication client registered to the user account, the communication session having been placed in a held state. If the attempt is successful, the first communication client is then engaged in the communication session.

137 Claims, 15 Drawing Sheets

U.S. PATENT DOCUMENTS

| | | | |
|---|---|---|---|
| 5,970,134 A * | 10/1999 | Highland et al. | 379/265.02 |
| 6,044,144 A * | 3/2000 | Becker et al. | 379/265.02 |
| 6,473,437 B2 * | 10/2002 | Stumer | 370/462 |
| 7,092,386 B2 | 8/2006 | Wynn | |
| 7,190,778 B2 * | 3/2007 | Kucmerowski | 379/211.01 |
| 7,283,823 B2 * | 10/2007 | Pearce et al. | 455/439 |
| 7,333,474 B2 * | 2/2008 | Toor et al. | 370/352 |
| 7,440,440 B1 * | 10/2008 | Abichandani et al. | 370/351 |
| 7,539,492 B2 * | 5/2009 | Jagadeesan et al. | 455/436 |
| 7,616,749 B2 * | 11/2009 | Poustchi | 379/211.02 |
| 7,730,111 B2 * | 6/2010 | DeAnna et al. | 707/803 |
| 7,734,527 B2 * | 6/2010 | Uzo | 705/37 |
| 7,734,663 B2 * | 6/2010 | DeAnna et al. | 707/803 |
| 7,860,089 B2 * | 12/2010 | Tripathi et al. | 370/389 |
| 7,899,172 B2 * | 3/2011 | Poustchi et al. | 379/211.02 |
| 8,010,647 B2 * | 8/2011 | Tanimoto | 709/223 |
| 8,069,256 B2 * | 11/2011 | Rasti | 709/229 |
| 8,078,151 B2 * | 12/2011 | Martin et al. | 455/414.1 |
| 2005/0243991 A1 * | 11/2005 | Fijolek et al. | 379/211.02 |
| 2006/0067327 A1 * | 3/2006 | Poustchi et al. | 370/395.5 |
| 2007/0150299 A1 * | 6/2007 | Flory | 705/1 |
| 2007/0211705 A1 * | 9/2007 | Sunstrum | 370/356 |
| 2008/0002709 A1 * | 1/2008 | Kennedy et al. | 370/395.1 |
| 2010/0183127 A1 * | 7/2010 | Uy et al. | 379/88.22 |
| 2011/0047628 A1 * | 2/2011 | Viars | 726/28 |

FOREIGN PATENT DOCUMENTS

WO    PCT/CA07/000639      1/2008

* cited by examiner

| Customer Identifier | Subscriber to Call Park Feature? | First-level Address | Second-level Address | Alias |
|---|---|---|---|---|
| 4162223333@serviceprovider.com | YES | 64.230.200.100 | 8080 | 3551 |
| | | 64.230.200.102 | 8081 | Alice |
| | | 64.230.200.101 | 8082 | 911 |
| 5149540000 | NO | N/A | N/A | Garage |
| ... | | | | N/A (default) |

FIG. 2

METHODS, APPARATUS AND COMPUTER-READABLE MEDIA FOR PROVIDING A NETWORK-BASED CALL PARK FEATURE

FIELD OF THE INVENTION

The present invention relates generally to communications and, more particularly, to providing a call park feature that is network-based.

BACKGROUND

"Call park" is a feature of some telephone systems that allows a person to put a call on hold at one telephone set and continue the conversation from another telephone set. The call park feature is typically most often used by businesses operating out of warehouses, buildings with many offices, or multi-floor complexes, where there is a likelihood that certain calls may need to be taken over by someone in a different area, in a different office or on a different floor.

Specifically, in the case of an incoming call, if the desired called party is not the person who picked up the call, and the desired called party is at an unknown location, the person who picked up the call may "park" the call and then use a public address (PA) system or other method to invite the desired called party to pick up the call.

Alternatively, during a conversation, a person may need to go to another office for some reason (for example, to retrieve an important file); parking the call allows this person to continue the conversation after arriving at the other office.

The "call park" feature is activated by pressing a preprogrammed button (usually labeled "Call Park") or a special sequence of buttons. The telephone system transfers the current telephone conversation to an unused extension number and immediately puts the conversation on hold. Thus, in essence, activating the call park feature causes an extension number to be temporarily assigned to an ongoing call. The telephone system then displays the extension number of the parked call so that the call can be retrieved within a set time.

The call can now be retrieved by dialing the extension number of the parked call from any telephone set. If no one picks up the parked call within the set time, the telephone system may ring back the parked call, in this way transferring the parked call back to the person who originally activated the call park feature.

While the availability of a call park feature as described above is common in many business environments, its proliferation amongst small businesses and residential customers is minimal. This is because the usefulness of the call park feature to a small business or residence tends to be outweighed by the cost and complexity of the specialized equipment currently required to implement this feature. For instance, a telephone system capable of implementing the signaling and logic described above is required, as are telephone sets capable of displaying the extension number of a parked call.

As a result, instead of proceeding to park a call as would be done in a large office environment, most small business and residential customers who own multiple telephone sets connected to a single telephone line continue to follow the age-old paradigm of telling the other party on the line "please wait a minute", yelling out someone's name, waiting for that someone to actually pick up the call, and then hanging up. This can be an inconvenience, particularly when the person originally on the call is needed elsewhere during the waiting period and cannot return to hang up the phone. Problems also arise in large households, as well as in environments where yelling is impermissible or considered uncouth.

Therefore, a need remains in the industry to lower the cost and complexity of providing a call park feature to small businesses, residences and other users.

SUMMARY OF THE INVENTION

According to a first broad aspect, the present invention seeks to provide a method, comprising receiving an indication of an intent to communicate using a first communication client registered to a user account; consulting a memory in an attempt to identify a communication session previously established with a party that is a communication client registered to said user account, said communication session having been placed in a held state; and engaging the first communication client in said communication session if said attempt is successful.

According to a second broad aspect, the present invention seeks to provide a computer-readable medium comprising computer-readable program code which, when interpreted by a computing apparatus, causes the computing apparatus to execute a method. The computer-readable program code comprises first computer-readable program code for causing the computing apparatus to be attentive to receipt of an indication of an intent to communicate using a first communication client registered to a user account; second computer-readable program code for causing the computing apparatus to consult a memory in an attempt to identify a communication session previously established with a party that is a communication client registered to said user account, said communication session having been placed in a held state; and third computer-readable program code for causing the computing apparatus to engage the first communication client in said communication session if said attempt is successful.

According to a third broad aspect, the present invention seeks to provide a network element comprising a control entity configured for receiving an indication of an intent to communicate using a first communication client registered to a user account; consulting a memory in an attempt to identify a communication session previously established with a party that is a communication client registered to said user account, said communication session having been placed in a held state; and engaging the first communication client in said communication session if said attempt is successful.

According to a fourth broad aspect, the present invention seeks to provide a system, comprising: a network comprising a plurality of networked communication clients registered to a common user account; and a network element communicatively coupled to the communication clients, the network element comprising a control entity configured for receiving an indication of an intent to communicate using a first communication client that is one of said communication clients; consulting a memory in an attempt to identify a communication session previously established with a party that is one of said communication clients, said communication session having been placed in a held state; and engaging the first communication client in said communication session if said attempt is successful.

According to a fifth broad aspect, the present invention seeks to provide a method, comprising: causing a communication session involving a communication client registered to a user account to be placed in a held state; selecting a subset of parties registered to the user account as intended recipients of an invitation to retrieve the communication session; transmitting an indication of the selected subset of parties to a control entity for transmittal of said invitation to its intended recipients.

According to a sixth broad aspect, the present invention seeks to provide a memory for storing data for access by computer-readable instructions being executed on a computer, comprising a data structure including information regarding a set of communication sessions placed in a held state, said information for each particular one of the communications sessions including a customer associated with the particular communication session and an indication of a party to the particular communication session prior to its having been placed in a held state.

According to a seventh broad aspect, the present invention seeks to provide a method, which comprises consulting a memory in an attempt to identify at least one communication client registered to a user account to which is registered a party with which a communication session has been previously established, the communication session having been placed in a held state; sending an invitation to retrieve the communication session to a first communication client that is one of the at least one communication client registered to the user account; and engaging the first communication client in the communication session upon receipt of an indication of an intent to communicate using the first communication client.

According to an eighth broad aspect, the present invention seeks to provide a computer-readable medium comprising computer-readable program code which, when interpreted by a computing apparatus, causes the computing apparatus to execute a method. The computer-readable program code comprises first computer-readable program code for causing the computing apparatus to consult a memory in an attempt to identify at least one communication client registered to a user account to which is registered a party with which a communication session has been previously established, the communication session having been placed in a held state; second computer-readable program code for causing the computing apparatus to send an invitation to retrieve the communication session to a first communication client that is one of the at least one communication client registered to the user account; and third computer-readable program code for causing the computing apparatus to engage the first communication client in the communication session upon receipt of an indication of an intent to communicate using the first communication client.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of non-limiting embodiments of the present invention is provided below, by way of example only, with reference to the accompanying drawings, in which:

FIG. 2 shows an example of potential contents of a database of the architecture;

It is to be expressly understood that the description and drawings are only for the purpose of illustrating certain non-limiting embodiments of the invention and are an aid for understanding. They are not intended to be a definition of the limits of the invention.

DETAILED DESCRIPTION OF NON-LIMITING EMBODIMENTS

Architecture

Figure 1:
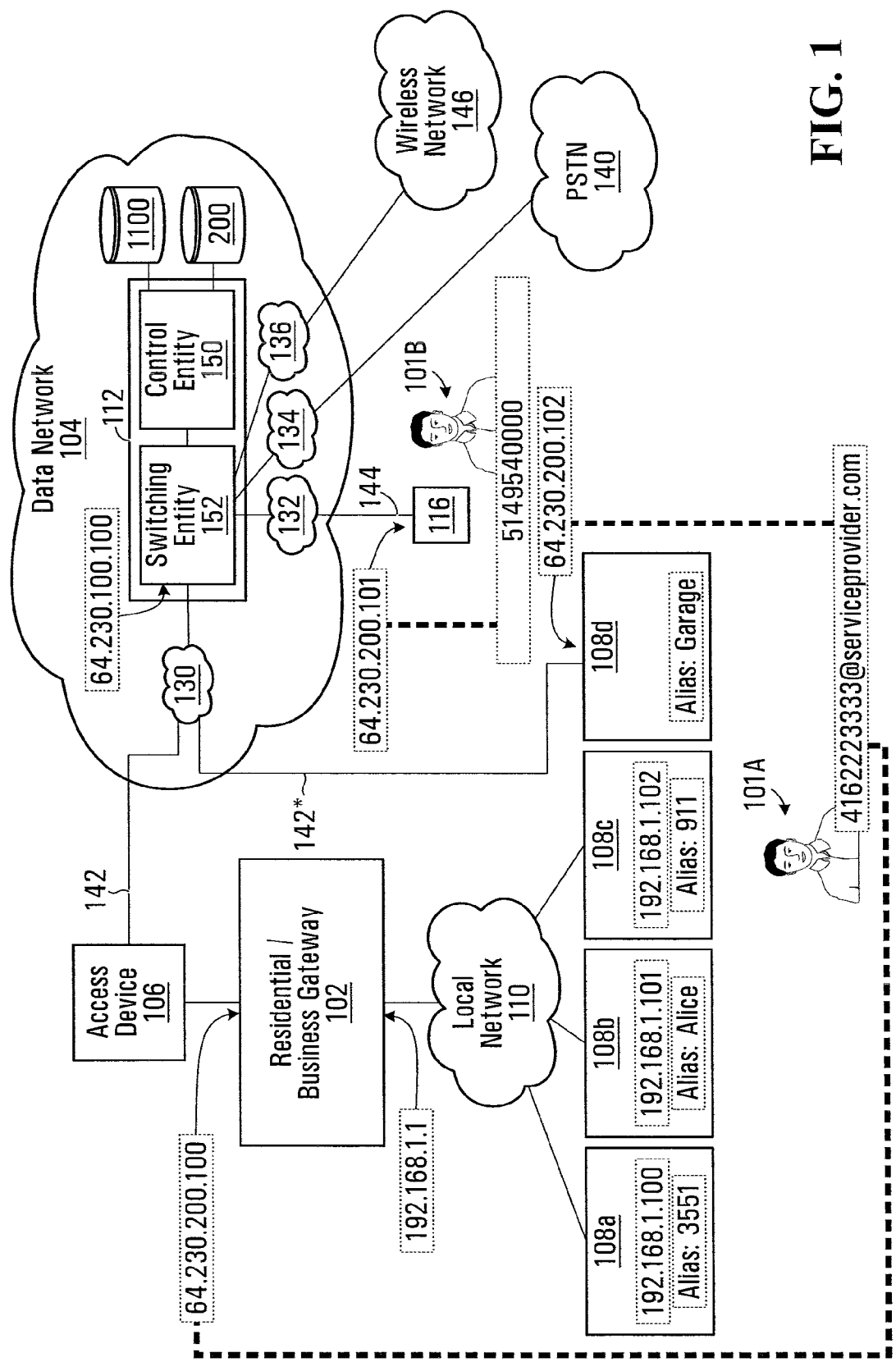
FIG. 1 shows an architecture for providing a network-based call park feature in accordance with a non-limiting embodiment of the present invention, the architecture comprising a network element operated by a service provider.

With reference to FIG. 1, there is shown an architecture for providing a network-based call park feature in accordance with a non-limiting embodiment of the present invention. The architecture comprises a data network 104 with a network element 112 operated by a service provider. The data network 104 may be connected to other networks, such as the public switched telephone network (PSTN) 140 and/or a wireless network 146. Communication with the PSTN 140 can be effected via a gateway 134, while communication with the wireless network 146 can be effected via a gateway 136.

The network element 112 can comprise circuitry, software and/or control logic for processing calls placed to and from various communication clients coupled to the data network 104. Examples of call processing include connecting incoming calls, routing outgoing calls, as well as applying a call park feature in accordance with a non-limiting embodiment of the present invention. Other features may also be provided, such as call waiting, call forking, etc. Additionally, the network element 112 can comprise suitable circuitry, software and/or control logic for routing outgoing calls to, and connecting incoming calls from, entities in the PSTN 140 and/or the wireless network 146 via the respective gateway 134, 136.

In accordance with a specific non-limiting example embodiment, the network element 112 can be implemented as a soft switch, such as the MCS 5200 Soft Switch manufactured by Nortel Networks Limited of 8200 Dixie Road, Brampton, Ontario L6T 5P6, Canada, although it should be appreciated that this is but one non-limiting example among many possibilities within the scope of the present invention.

The network element 112 can comprise a switching entity 152 that executes signaling and switching operations on calls traveling through the data network 104, as well as a control entity 150 that executes a variety of applications for intelligently controlling the signaling and switching operations performed by the switching entity 152. For example, the control entity 150 can provide control instructions to the switching entity 152. In some embodiments, the switching entity 152 and the control entity 150 may be part of the same physical device (e.g., a soft switch), while in other embodiments, the switching entity 152 and the control entity 150 may be separate physical devices.

The service provider that operates the network element 112 provides communication services to a plurality of customers, two of which are represented by the reference numerals 101A and 101B. According to a non-limiting embodiment of the present invention, the network element 112 implements a call park feature for customer 101A as well as other customers.

Each of the customers is registered with the control entity 150 under a customer identifier (or "user account"), which can be, for example and without limitation, a session initiation protocol (SIP) uniform resource identifier (URI). In the present non-limiting example, customer 101A is registered under a customer identifier which is, in this case, the SIP URI "4162223333@serviceprovider.com", but which could have been a standard PSTN number or other type of customer identifier. For its part, customer 101B is registered under a customer identifier which is, in this case, the standard PSTN number "5149540000", but which could have been a SIP URI or other type of customer identifier. Other customers may of course be registered under different customer identifiers. Naturally, different formats for the customer identifier, such as wireless account numbers, usernames and the like, can be used while remaining within the scope of the invention.

Database 200

In accordance with a non-limiting embodiment of the present invention, registration of the customers 101A, 101B is reflected by the contents of a database 200 (or other memory), shown in greater detail in FIG. 2. For the purposes of the present non-limiting example, the database 200 comprises a plurality of records 220, 230 respectively associated with customers 101A, 101B. Records associated with customers other than customers 101A, 101B are represented by reference numeral 240. Of course other data structures could be used, such as linked lists, tables, etc.

Each record in the database 200 has a respective customer identifier field 202. The customer identifier field 202 of the record associated with a given customer stores the customer identifier of the given customer. Thus, in the present non-limiting example, the customer identifier field 202 of the record 220 associated with customer 101A stores the PSTN number 5149540000, while the customer identifier field 202 of the record 230 associated with customer 101B stores the SIP URI 4165556666@serviceprovider.com.

The record associated with a given customer further comprises an indication of whether the given customer subscribes to a call park feature as contemplated herein. In the present non-limiting example, customer 101A does subscribe to the call park feature, while customer 101B does not. Accordingly, the record 220 associated with customer 101A includes a subscription field 206 that is positively marked, while the record 230 associated with customer 101B includes a subscription field 206 that is negatively marked. The subscription field 206 of the record associated with a given customer can be populated based on instructions from, or interaction with, the given customer at a suitable time and in a variety of different ways, such as via phone, web, email, post, etc.

In order to make or receive communication attempts, each of the customers 101A, 101B utilizes one or more registered communication clients. A communication client registered to a given customer is a device where the given customer can be reached when an incoming call is placed to the given customer and/or from which the given customer expects to make outgoing calls. Depending on the circumstances, such a communication client may be a landline telephone in the PSTN 140, a mobile phone in the wireless network 146, a VoIP phone in the data network 104, a computer in the data network 104 running a VoIP soft client, and the like.

In the present example, there are four (4) communication clients registered to customer 101A, namely communication clients 108A, 108B, 108C, 108D, and one (1) communication client registered to customer 101B, namely communication client 116. Each communication client is associated with "address information" that allows the network element 112 to properly handle calls involving that communication client. The address information associated with the communication client(s) registered to a given customer is stored in the database 200 in a respective address field 204 for each communication client.

The address information associated with a particular communication client may include a first-level address and, possibly, a second-level address. First-level addresses are referred to as "public" or "discoverable", in the sense that they allow the communication clients with which they are associated to be uniquely identified within the data network 104. As such, first-level addresses are sufficient to properly handle calls involving a particular communication client when the particular communication client is connected in such a way that it is reachable directly via the data network 104. In the example architecture of FIG. 1, this is the case with communication client 116 and communication client 108D.

Specifically, communication client 116 (registered to customer 101B) is connected to the network element 112 via a communication link 144 and a portion 132 of the data network 104. The portion 132 of the data network 104 may comprise one or more switches, multiplexers, concentrators and other equipment. The communication link 144 can be any suitable wired, wireless or optical communication link, such as an xDSL link, an Ethernet link, a fiber optic link (e.g., Fiber-to-the-Premise, Fiber-to-the-Curb, etc.), a wireless link (e.g., EV-DO, WiMax, WiFi, CDMA, TDMA, GSM, UMTS, etc.), a coaxial cable link, or a combination thereof.

In the present non-limiting example, communication client 116 is addressable by an Internet Protocol (IP) v4 address, in this case 64.230.200.101. Therefore, the complete address information for communication client 116 is a first-level address corresponding to the IP address 64.230.200.101. Other examples of a first-level address include an electronic serial number (ESN), a media access control (MAC) address, a URL, another version of an Internet Protocol (IP) address, a proprietary identifier, etc. Although no second-level address is required for communication client 116, it is within the scope of the present invention to nevertheless provide a second-level address that can be arbitrary or set to a default value.

Similarly, communication client 108D (registered to customer 101A) is connected to a portion 130 of the data network 104 via a communication link 142*. The portion 130 of the data network 104 may comprise one or more switches, multiplexers, concentrators and other equipment. The communication link 142* can be any suitable wired, wireless or optical communication link, such as an xDSL link, an Ethernet link, a fiber optic link (e.g., Fiber-to-the-Premise, Fiber-to-the-Curb, etc.), a wireless link (e.g., EV-DO, WiMax, WiFi, CDMA, TDMA, GSM, UMTS, etc.), a coaxial cable link, or a combination thereof.

In the present non-limiting example, communication client 108D is addressable by an Internet Protocol (IP) v4 address, in this case 64.230.200.102. Therefore, the complete address information for communication client 108D is a first-level address corresponding to the IP address 64.230.200.102. Other examples of a first-level address include an electronic serial number (ESN), a media access control (MAC) address, a URL, another version of an Internet Protocol (IP) address, a proprietary identifier, etc. Although no second-level address is required for communication client 108D, it is within the scope of the present invention to nevertheless provide a second-level address that can be arbitrary or set to a default value.

In view of the reachability of communication clients 108D and 116 by a first-level address, it will be appreciated that packets originating from communication client 108D will have a source address of 64.230.200.102 and packets destined for communication client 108D will have a destination address of 64.230.200.102, while packets originating from communication client 116 will have a source address of 64.230.200.101 and packets destined for communication client 116 will have a destination address of 64.230.200.101.

In contrast, in the present embodiment, communication clients 108A, 108B and 108C are not reachable directly via the data network 104, but rather communicate via an intermediary (which is reachable via the data network 104). In the present non-limiting example, the intermediary is a residential/business gateway 102. Thus, the address information required for proper handling of calls involving the communication clients 108A, 108B, 108C includes both a first-level address and a second-level address. The first-level address is a "public" or "discoverable" address associated with the residential/business gateway 102. In the present non-limiting example, residential/business gateway 102 is addressable by an Internet Protocol (IP) v4 address, in this case 64.230.200.100, although other addresses and address format are within the scope of the present invention. This first-level address will be common to each of communication clients 108A, 108B and 108C, while the second-level address will be unique to each communication client, as will now be described in greater detail.

Of course, in other embodiments, one or more of the communication clients 108A, 108B and 108C, although connected to the residential/business gateway 102, may nevertheless be reachable via their own first-level addresses (e.g., "public" or "discoverable" IP addresses).

Turning now to the specific non-limiting case where communication clients 108A, 108B, 108C are reachable by a combination of first-level and second-level addresses, the communication clients 108A, 108B, 108C may communicate with the residential/business gateway 102 via a local network 110, which is optional. Communication clients 108A, 108B, 108C may be distributed throughout a household or small business; furthermore, they may be located within the same building or they may be geographically disparate. While only three communication clients are illustrated in FIG. 1 as being connected to the residential/business gateway 102, it should be understood that the present invention does not impose any limitation on the number of communication clients that may communicate with the residential/business gateway 102. It should also be appreciated that when the communication clients are geographically disparate, the manner in which they access the data network 104 can involve a plurality of access devices or gateways.

The residential/business gateway 102 may be connected to the network element 112 via an access device 106, a communication link 142 and the aforesaid portion 130 (or another portion) of the data network 104. The communication link 142 can be any suitable wired, wireless or optical communication link, such as an xDSL link, an Ethernet link, a fiber optic link (e.g., Fiber-to-the-Premise, Fiber-to-the-Curb, etc.), a wireless link (e.g., EV-DO, WiMax, WiFi, CDMA, TDMA, GSM, UMTS, etc.), a coaxial cable link, or a combination thereof.

It should be appreciated that the specific implementation of the access device 106 will be dependent on the specific implementation of the communication link 142. Thus, in an embodiment where the communication link 142 is an xDSL link, the access device 106 may be an xDSL modem. In another embodiment where the communication link is a WiMax link, the access device 106 may be a WiMax modem. It should also be appreciated that in certain embodiments, some or all of the functionality of the access device 106 can be incorporated into the residential/business gateway 102.

Each of the devices on the local network 110 (namely, the residential/business gateway 102 and communication clients 108A, 108B, 108C) is associated is with a local, or "private" address, which is valid only for communication within the local network 110. Such private addresses may take the form of an electronic serial number (ESN), a media access control (MAC) address, a URL, an Internet Protocol (IP) address, a proprietary identifier, etc. In the non-limiting example being described here, the residential/business gateway 102 is associated with a private IP address 192.168.1.1, while communication clients 108A, 108B, 108C are associated with private IP addresses 192.168.1.100, 192.168.1.101, 192.168.1.102, respectively. These private addresses can be assigned by the residential/business gateway 102 or by another entity, such as a Dynamic Host Configuration Protocol (DHCP) server (not shown), for example.

For data that circulates exclusively within the local network 110, the use of private addresses is satisfactory. However, for data that enters or needs to exit the local network 110 (such as call-related data that is exchanged between communication clients 108A, 108B and 108C on one hand, and the data network 104 on the other), there needs to be a way to distinguish between data destined for—or originating from— different ones of communication clients 108A, 108B, 108C.

In one non-limiting approach, when a given communication client, say communication client 108A, initiates a communication session, it selects an IP "port", which is specified in all packets related to the current session that it sends onto the local network 110. Upon receipt of packets from communication client 108A, the residential/business gateway 102 therefore knows the port being used by communication client 108A. If the communication initiated by communication client 108A is destined for the data network 104 (based on information contained in the received packets), then the residential/business gateway 102 sends the received (outward bound) packets onto the data network 104, but replaces the source address of the packet with the public IP address of the residential/business gateway 102. In addition, the port may or may not be modified by the residential/business gateway 102, depending on whether it needs to avoid ambiguity due to other communication clients 108B, 108C having already selected the port in question. In the opposite direction of communication, when packets are received from the data network 104 and specify the port that had been utilized by communication client 108A (or, if applicable, the modified port as to modified by the residential/business gateway 102), the residential/business gateway 102 will recognize that the packet is destined for communication client 108A and will therefore replace the destination address of those packets with the private IP address of communication client 108A (along with changing the port value, if applicable) prior to sending the received (incoming) packets onto the local network 110. To achieve the aforementioned address translation functionality, the residential/business gateway 102 can maintain an internal mapping that allows the residential/business gateway 102 to know which ports are associated with which communication clients.

In the present non-limiting example, it is assumed that ports 8080, 8081, 8082 are respectively utilized by communication clients 108A, 108B, 108C having respective private addresses 192.168.1.100, 192.168.1.101, 192.168.1.102. For simplicity, it is assumed that the residential/business gateway 102 does not perform a modification of the ports when routing packets between communication clients 108A, 108B and 108C on one hand, and the data network 104 on the other. Thus, in the present example, the second-level addresses associated with the communication clients 108A, 108B, 108C are the identities of the corresponding ports utilized by those communication clients, namely 8080, 8081 and 8082, respectively.

In summary, therefore, the complete address information for communication client 108A includes a first-level address corresponding to the IP address 64.230.200.100 in combination with a second-level address corresponding to port 8080, the complete address information for communication client 108B includes a first-level address corresponding to the IP address 64.230.200.100 in combination with a second-level address corresponding to port 8081 and the complete address information for communication client 108C includes a first-level address corresponding to the IP address 64.230.200.100 in combination with a second-level address corresponding to port 8082. These three sets of address information are stored in the database 200 in respective address fields 204 of the record 220 associated with customer 101A. Other types of first- and second-level addresses are of course possible and include an electronic serial number (ESN), a media access control (MAC) address, a URL, another version of an Internet Protocol (IP) address, a proprietary identifier, etc.

Populating the Database 200

The information in the address fields 204 of the database 200 can be populated in a variety of ways. For example, this may occur during a registration phase involving a given communication client and the control entity 150, which comprises suitable software, hardware, firmware and/or control logic for executing a registration process.

For example, regarding communication client 108D, the registration phase might begin after customer 101A acquires communication client 108D from the service provider, with communication client 108D having been programmed with an address where the control entity 150 can be reached in the data network 104. In the present non-limiting example, the address where the control entity 150 can be reached is an IP v4 address, namely, 64.230.100.100, although other addresses and addressing schemes are within the scope of the present invention. In other embodiments, communication client 108D is programmed with an address where a proxy server can be reached, and it is the proxy server that ultimately knows how to reach the control entity 150. In either case, when communication client 108D is activated, it establishes its presence on the data network 104 and contacts the control entity 150. By virtue of executing the registration process, the control entity 150 determines that communication client 108D is associated with customer 101A in one of various ways, such as by comparing the IP address of communication client 108D to a statically pre-provisioned address known a priori to be associated with customer 101A, or by obtaining credentials entered by customer 101A via communication client 108D. In either case, one of the address fields 204 of the record 220 associated with customer 101A will be populated with a first-level address, in this case the IP address of communication client 108D, namely 64.230.200.102.

Regarding the communication clients 108A, 108B, 1080 connected to the residential/business gateway 102, the registration phase might begin after customer 101A acquires the residential/business gateway 102 from the service provider, with the residential/business gateway 102 having been programmed with an address where the control entity 150 can be reached in the data network 104. In the present non-limiting example, the address where the control entity 150 can be reached is the IP address 64.230.100.100. In other embodiments, the residential/business gateway 102 is programmed with an address where a proxy server can be reached, and it is the proxy server that ultimately knows how to reach the control entity 150. In either case, when the residential/business gateway 102 is activated, it establishes its presence on the data network 104 and contacts the control entity 150. By virtue of executing the registration process, the control entity 150 determines that the residential/business gateway 102 is associated with customer 101A in one of various ways, such as by comparing the IP address of the residential/business gateway 102 to a statically pre-provisioned address known to be associated with customer 101A, or by obtaining credentials entered by customer 101A via the residential/business gateway 102.

Of course, in embodiments where one or more of the communication clients 108A, 108B, 108C is reachable via their own first-level addresses (e.g., "public" or "discoverable" IP addresses), the control entity 150 does not need to know how to reach the residential/business gateway 102 through which these one or more communication clients 108A, 108B, 108C communicate.

Next, as individual ones of communication clients 108A, 108B, 108C are activated, they might attempt a communication with the control entity 150. This is achieved via the residential/business gateway 102. The control entity 150 then executes a registration process in respect of the individual communication clients 108A, 108B, 108C. For example, when communication client 108A is activated, it talks to the control entity 150 which determines (based on examination of the packets received from communication client 108A) that port 8080 is to be used for communication with communication client 108A via residential/business gateway 102. This additional knowledge allows the control entity 150 to compile complete address information for communication client 108A, consisting of a first-level address (which is the IP address of the residential/business gateway 102 discovered above, namely 64.230.200.100) and a second-level address (namely, port 8080). As already mentioned, this complete address information is stored in the database 200 in a respective one of the address fields 204 of the record 220 associated with customer 101A.

Similarly, in the present example, the control entity 150 will compile complete address information for communication clients 108B and 108C, consisting of the same first-level address (which is the IP address of the residential/business gateway 102, namely 64.230.200.100) and respective second-level addresses (which are the identities of ports 8081 and 8082, respectively). As already mentioned, this complete address information is stored in the database 200 in respective ones of the address fields 204 of the record 220 associated with customer 101A.

It should be understood that individual ones of communication clients 108A, 108B, 108C may be de-activated and/or re-activated at random times. This can correspondingly result in a fluctuation regarding the number and content of the address fields 204 associated with customer 101A. Also, the content of the address field(s) 204 of the record 220 associated with customer 101A may change even while communication clients 108A, 108B, 108C remain online, for example if there is a dynamic change in the private address of one of communication clients 108A, 108B, 108C.

Aliasing

Those skilled in the art will appreciate that subscribing to the call park feature as contemplated herein will be advantageous when communication clients 108A, 108B, 108C, 108D are employed by different people and/or are installed at different locations of a residence or business. Thus, it may be the case that the user of one of communication clients 108A, 108B, 108C, 108D wishes to reach the user of another one of communication clients 108A, 108B, 108C, 108D. In accordance with non-limiting embodiments of the present invention, this is made possible by associating an alias (or "nickname", or "extension") with each of the various communication clients 108A, 108B, 108C, 108D. By "alias" is meant a mnemonic, shortened string or other code that is different from the private IP address of the communication client in question. In one specific non-limiting embodiment, the alias can be designed to be quickly entered on a telephone and thus can consist of a short (e.g., 1-, 2-, 3-, 4- or 5-digit) number. In other embodiments, the alias can be a name, such as "Alice" or "Bob", "Shipping" or "Accounts", etc. Still other possibilities can exist without departing from the scope of the invention.

In some embodiments, each of the communication clients 108A, 108B, 108C, 108D registered to customer 101A may be associated with a respective alias, while in other embodiments, this need not be the case. In still other embodiments, two or more of the communication clients 108A, 108B, 108C, 108D may be associated with the same alias.

In the present non-limiting example, the alias associated with communication client 108A is "3551", the alias associated with communication client 108B is "Alice", the alias associated with communication client 108C is "911" and the alias associated with communication client 108D is "Garage". Thus, in a small business scenario, for example, dialing "3551" from any of communication client 108B, 108C or 108D signifies an attempt to reach an employee deemed to be associated with communication client 108A, typing/dialing "Alice" from any of communication client 108A, 108C or 108D signifies an attempt to reach an employee named Alice (presumably via communication client 108B), dialing "911" from any of communication client 108A, 108B or 108D signifies an attempt to reach the security desk (presumably via communication client 108C), and typing/dialing "Garage" from any of communication client 108A, 108B or 108C signifies an attempt to reach the warehouse (presumably via communication client 108D).

The association between aliases and communication clients can be stored in the database 200. Specifically, each given address field 204 of the record 220 associated with customer 101A comprises a corresponding alias field, which can be blank (when there is no alias assigned) or specifies the alias of the communication client reachable using the address information in the given address field 204. Thus, as illustrated, the combination of IP address 64.230.200.100 and port 8080 (which form the complete address information required to reach communication client 108A) is associated with alias "3551", the combination of IP address 64.230.200.100 and port 8081 (which form the complete address information required to reach communication client 108B) is associated with alias "Alice", the combination of IP address 64.230.200.100 and port 8082 (which form the complete address information required to reach communication client 108C) is associated with alias "911", and IP address 64.230.200.102 (which forms the complete address information required to reach communication client 108D) is associated with alias "Garage". In this example, the record 230 associated with customer 101B comprises a corresponding alias field 210, which is blank or set to a default value in order to signify that there is no alias associated with communication client 116.

Database 1100

Figure 3:
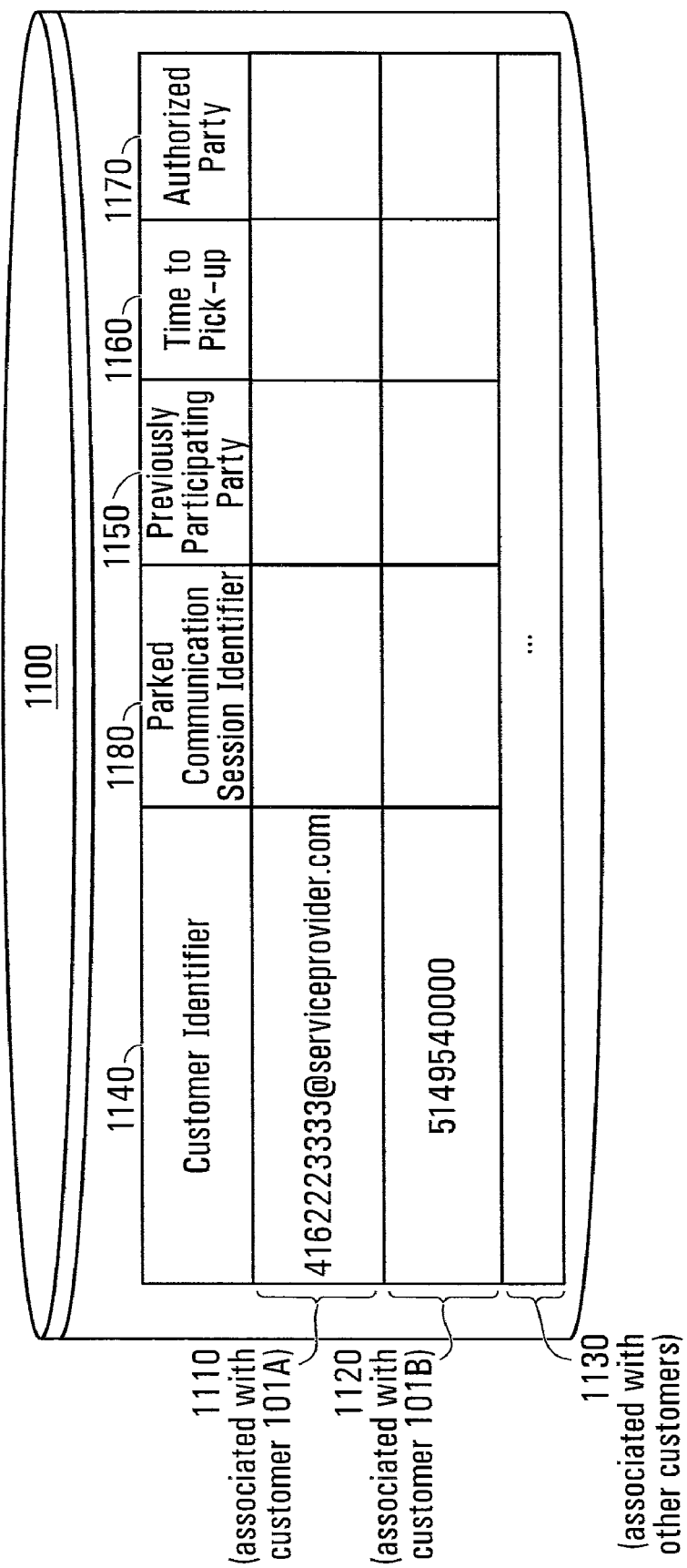
FIG. 3 shows an example of potential contents of another database of the architecture.

In order to implement the call park feature in accordance with non-limiting embodiments of the present invention, the control entity 150 has access to a second database 1100 (or other memory), shown in FIG. 3. More specifically, the database 1100 comprises a plurality of records 1110, 1120, 1130. Records 1110 and 1120 are associated with customers 101A and 101B, respectively, while record 1130 represents records associated with other customers. Each of the records 1110, 1120 has a customer field 1140 that identifies the customer with which that record is associated. Each of the records 1110, 1120 may comprise additional fields that will be filled if there is a communication session (I) that has been previously established with a party that is a communication client registered to that customer, and (II) such communication session has been "parked", i.e., placed in a held state. Specifically, these additional fields include a "parked communication session identifier" field 1180, a "previously participating party" field 1150, a "time to pick-up" field 1160 (which is optional) and an "authorized party" field 1170 (also optional).

In particular, let it be assumed that there is a given communication session that has been previously established with a given communication client registered to a given customer, and that the given communication session has been parked. Various possibilities for parking the given communication session (i.e., placing it in a held state) will be described later on in greater detail. Under these circumstances, an identifier of the given communication session could be stored in the "parked communication session identifier" field 1180 of the record associated with the given customer. The "previously participating party" field 1150 of the record associated with the given customer could identify the address information associated with the given communication client. The "time to pick-up" field 1160, if used, could be indicative of a maximum amount of time that the communication session is allowed to persist in a held state, that is, an amount of time within which the given communication session should be retrieved or "un-parked". Various possibilities for retrieving the communication session will be described later on in greater detail. Finally, the "authorized party" field 1170, if used, could be indicative of one or more communication clients registered to the given customer and/or one or more individuals that have the exclusive right to retrieve the given communication session.

Parking a Communication Session

Further detail regarding the manner in which the call park feature can be invoked and utilized by a customer subscribing to this feature is now described with reference to FIG. 4A, which illustrates a communication session 10 in progress between two parties. For the purposes of understanding the present invention, it is immaterial how the communication session 10 may have been established. In the present non-limiting example which refers to the architecture of FIG. 1, the two parties to the communication session 10 are communication client 116 and communication client 108B. The communication session 10 thus provides a media path for the transport of data, voice and/or other media between communication client 116 and communication client 108B. The communication session 10 traverses a first media path leg 10A between communication client 116 and the network element 112, and a second media path leg 10B between the network element 112 and communication client 108B. In a non-limiting example, the communication session 10 may be a telephony call.

While the communication session 10 is in progress, communication client 108B generates a command 12 to place the communication session 10 in a held state (i.e., to "park" the communication session 10). The command 12 is generated in response to input from a user of communication client 108B. Examples of user input that can lead to generation of the command 12 include, inter alia, pressing a sequence of keys (e.g., *55, #33# and the like) or a special-purpose key on communication client 108B, uttering a recognizable voice command into a microphone of communication client 108B, etc. Communication client 108B is suitably equipped to process the user input in order to generate the command 12.

In accordance with non-limiting embodiments of the present invention, the command 12 generated by the communication client 108B has a destination that is the network element 112. Because the second media path leg 10B of the communication session 10 also extends between communication client 108B and the network element 112, the command 12 can be sent either in-band with (i.e., mixed in with the media transported by the second media path leg 10B of the communication session 10 or as an independent signaling path in parallel with the second media path leg 10B of the communication session 10.

Figure 4A:
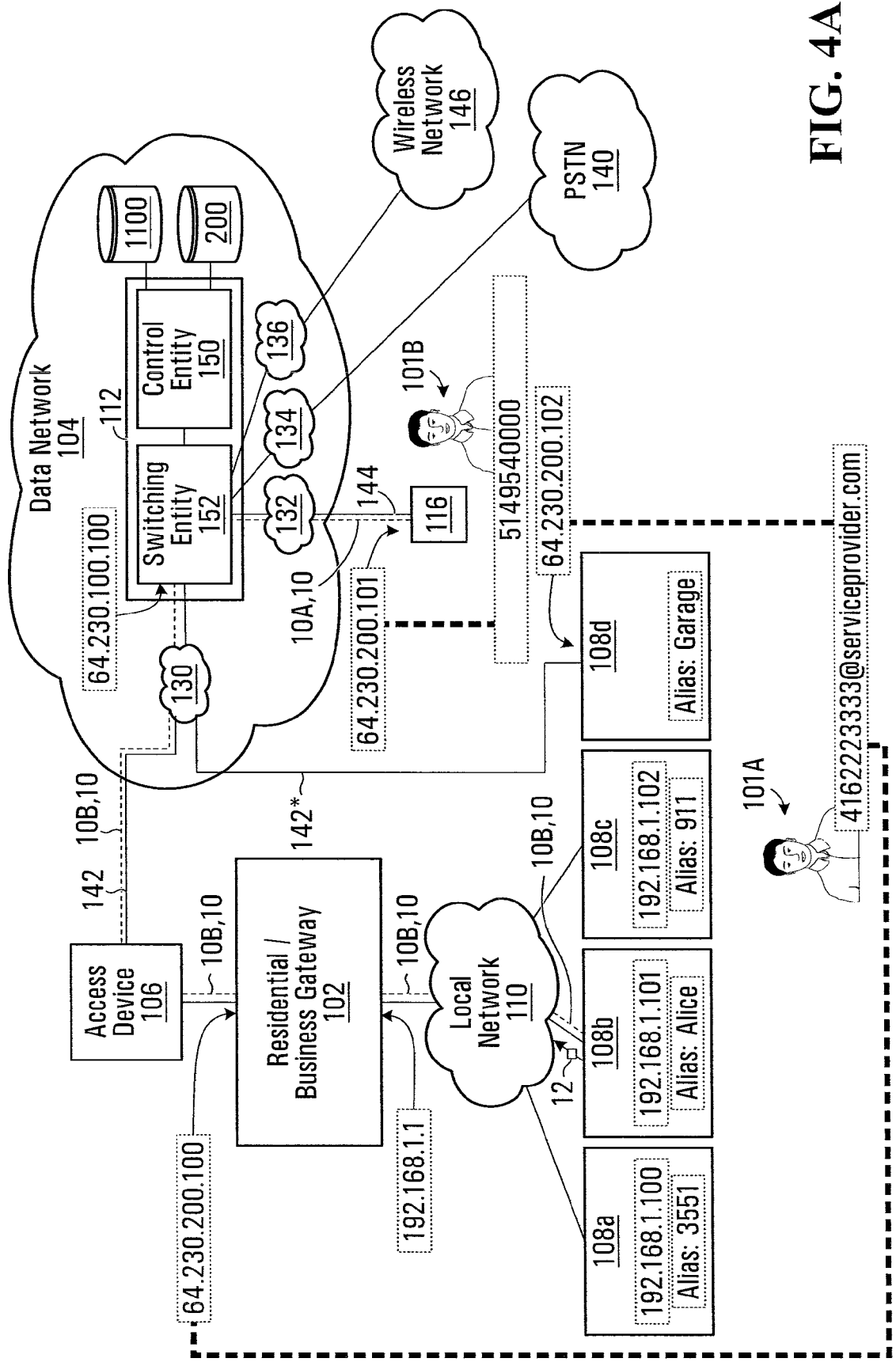
FIGS. 4A, 4B and 5 illustrate example scenarios in which the call park feature can be invoked and utilized by a customer subscribing to this feature.
Figure 4B:
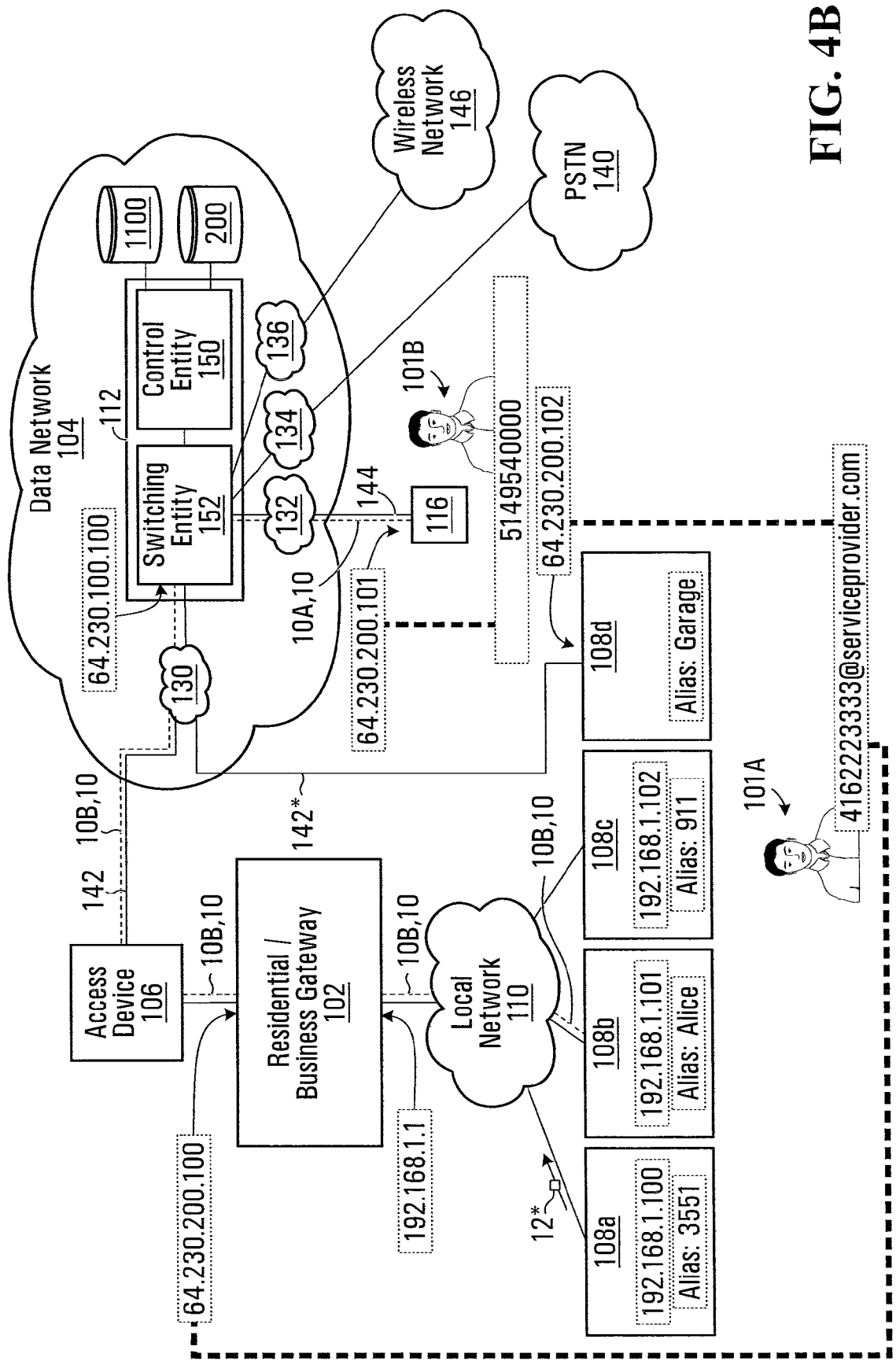

FIG. 4B illustrates an alternative to FIG. 4A, in which a communication client that is not a party to the communication session 10 generates a command 12* to place the communication session 10 in a held state (i.e., to park the communication session 10). In the illustrated example, the command 12* is generated in response to input from a user of communication client 108A. This can be useful when the user of communication client 108A, located in a different part of the household or business, overhears the user of communication client 108B and wishes to take over the communication session 10 from the user of communication client 108B. In this case, communication client 108A is suitably equipped to process user input in order to generate the command 12*. Since communication client 108A is not a party to the communication session 10, there is no media path between communication client 108A and the network element 112. Therefore, the command 12* can be sent by communication client 108A along an independent signaling path established with the network element 112.

Figure 5:
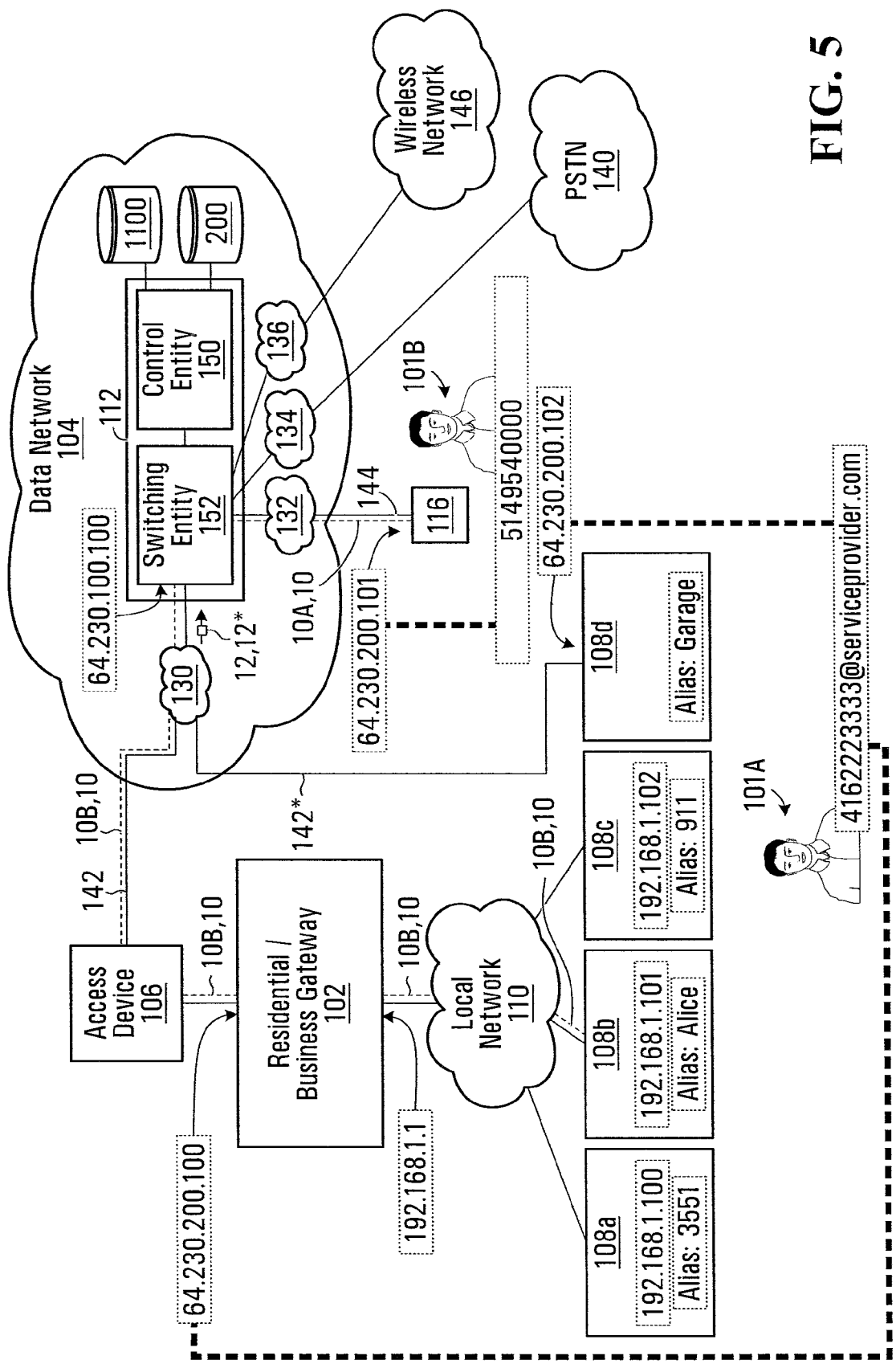

Reference is now made to FIG. 5, which illustrates receipt and detection of the command 12, 12* by the network element 112 and, in particular, the control entity 150. In a non-limiting example, the command 12, 12* may be a SIP invite; in another non-limiting example, the command 12, 12* may be a sequence of DTMF tones; still other possibilities are within the scope of the present invention. By detecting the command 12, 12*, the control entity 150 is made aware that a command to place a communication session in a held state has been generated. The control entity 150 also identifies the customer to whom the communication client having issued the command 12, 12* is registered. In this case, the control entity 150 determines that the command 12, 12* has been received from a communication client registered to customer 101A. Next, the control entity 150 consults the database 200 to determine whether customer 101A subscribes to the call park feature. In this case, the control entity 150 learns that user 101A does subscribe to the call park feature.

Next, the control entity 150 determines which communication session to place in a held state. This can be done in a variety of ways. For example, in the case where the command 12 was received in-band or in parallel with the communication session 10, the control entity 150 may conclude from this command that communication session 10 is to be placed in a held state. Alternatively, the control entity 150 may independently determine whether there is a communication session currently involving any communication client registered to the customer to which is registered the communication client having generated the command 12, 12* and, if so, to identify such a communication session as being a communication session to be placed in a held state.

Having identified a particular communication session to be parked placed in a held state), the control entity 150 causes the particular communication session to be placed in a held state. In this case, the control entity 150 causes the communication session 10 to be placed in a held state. More specifically, the control entity 150 sends control instructions to the switching entity 152 in order to cause the portion of the communication session 10 between the switching entity 152 and communication client 108B to be terminated and resulting in a temporarily curtailed version of the communication session 10.

The control entity 150 then populates the database 1100 with information regarding the communication session that was placed in a held state, in this case communication session 10. More particularly, the control entity 150 updates the "parked communication session identifier" field 1180 of record 1110 (associated with customer 101A) with an identifier of the communication session 10. The control entity 150 also updates the "previously participating party" field 1150 of record 1110 with the address information associated with communication client 108B, which is registered to customer 101A and is the party with which the communication session 10 had been established before it was placed in a held state.

It should be appreciated that in addition to indicating a desire to place a communication session in a held state, the command 12, 12* may specify additional information that is processed by the control entity 150 and used to update the database 1100. For example, the command 12, 12* may include an identifier of the communication session to be placed in a held state.

In addition or alternatively, the command 12, 12* may identify one or more "authorized parties". In one specific non-limiting embodiment, the one or more "authorized parties" correspond to one or more communication clients registered to the same customer as the one to which is registered the communication having generated the command 12, 12*, and having the exclusive right to retrieve the communication session that was placed in a held state. In this case, the command 12, 12* may identify one or more communication clients registered to customer 101A and having the exclusive right to retrieve (i.e., "un-park") the communication session 10. The control entity 150 then populates the database 1100 with information regarding the one or more authorized parties identified by the command 12, 12*. More particularly, the control entity 150 updates the "authorized party" field 1170 of the record 1110 (associated with customer 101A) with the address information associated with the one or more communication clients identified as "authorized parties".

In another specific non-limiting embodiment, the one or more "authorized parties" correspond to one or more individuals having the exclusive right to retrieve the communication session that was placed in a held state. In this case, the command 12, 12* may identify codes (e.g., PIN numbers) associated with one or more of these individuals having the exclusive right to retrieve (i.e., "un-park") the communication session 10. The control entity 150 then populates the database 1100 with these codes. More particularly, the control entity 150 updates the "authorized party" field 1170 of the record 1110 (associated with customer 101A) with codes such as PIN numbers associated with the one or more individuals identified as "authorized parties".

In addition or alternatively, the command 12, 12\* may explicitly identify a "time to pick-up" indicative of a maximum amount of time that the communication session 10 is allowed to persist in a held state, that is, an amount of time within which the communication session 10 is required to be retrieved. Alternatively, the command 12, 12\* may contain an indication implicitly specifying that a default "time to pick-up" is to be applied to the communication session in respect of which the command 12, 12\* is being generated. The control entity 150 then populates the database 1100 with information regarding the time to pick-up explicitly or implicitly identified by the command 12, 12\*. More particularly, the control entity 150 updates the "time to pick-up" field 1160 of the record 1110 (associated with customer 101A) with time information identified explicitly or implicitly by the command 12, 12\*.

Invitation to Retrieve a Parked Communication Session

Reference is now made to FIGS. 6A to 6D, which illustrate various non-limiting ways in which one party (the "inviting party") can cause the transmission of an invitation to retrieve a particular communication session that has been placed in a held state to one or more "intended recipients". In the examples to follow with reference to FIGS. 6A to 6D, there is a one-way invitation sent from the inviting party to each of the intended recipients. Embodiments where a two-way media path is established between the inviting party and an intended recipient who responds to the invitation will be described later on in greater detail with reference to FIGS. 7A to 7D. For simplicity, in each of the examples to follow, the particular communication session is the communication session 10 and the inviting party is communication client 108B, although this is not to be construed as a limitation of the present invention. The intended recipients will vary in different example situations, as is now described in greater detail.

Figure 6A:
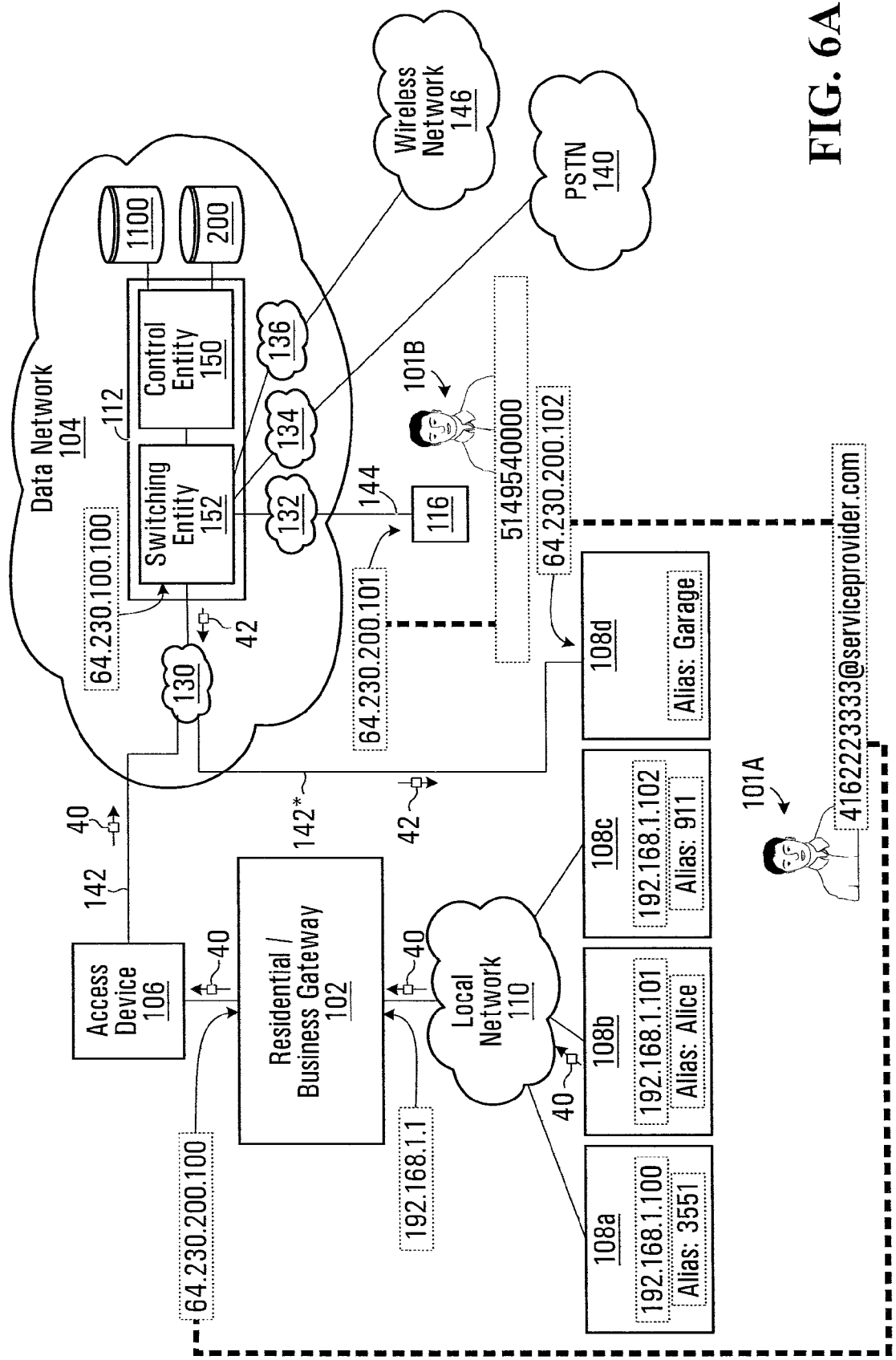
FIGS. 6A to 6D illustrate various example ways in which one party can invite one or more other parties to retrieve a particular communication session that has been parked, wherein there is a one-way message sent from the inviting party to one or more intended recipients.

With specific reference to FIG. 6A, consider that there is a single intended recipient and that it is a specific communication client registered to the same customer as communication client 108B, such as, say, communication client 108D. Consider that communication client 108B attempts to reach communication client 108D in order to invite it to take over the communication session 10 that has been placed in a held state as previously described. In order to invite communication client 108D, communication client 108B can generate a paging message 40 destined for the control entity 150 and specifying the alias associated with communication client 108D, which in the present example is "Garage". Upon receipt of the paging message 40, the residential/business gateway 102 forwards the paging message 40 to the control entity 150. The control entity 150 identifies customer 101A (based on the packets being received from communication client 108B) and consults the record 220 in the database 200 to determine that the alias "Garage" corresponds to the IP address 64.230.200.102.

In one non-limiting embodiment, the control entity 150 consequently sends an invitation 42 to the intended recipient, in this case communication client 108D, which causes communication client 108D to emit a perceptible signal in order to alert a nearby user. In non-limiting examples, communication client 108D can be caused to ring, vibrate or display a flashing or blinking indicator (e.g., light, icon, etc.). Alternatively, where communication client 108D is equipped with a loudspeaker, the invitation 42 may contain a voiceband signal which, when received by communication client 108D, will be output over the loudspeaker.

In some embodiments, the invitation 42 is a trigger that initiates the emission of the perceptible signal by communication client 108D, while in other embodiments, the invitation 42 is a signal that itself carries or encodes the perceptible signal. Where the invitation 42 does indeed carry or encode the perceptible signal, this perceptible signal may have been originally carried or encoded in the paging message 40 generated by communication client 108B, or it may have been created by the control entity 150 in response to receipt of the paging message 40 when the latter is in the form of a trigger.

Figure 6B:
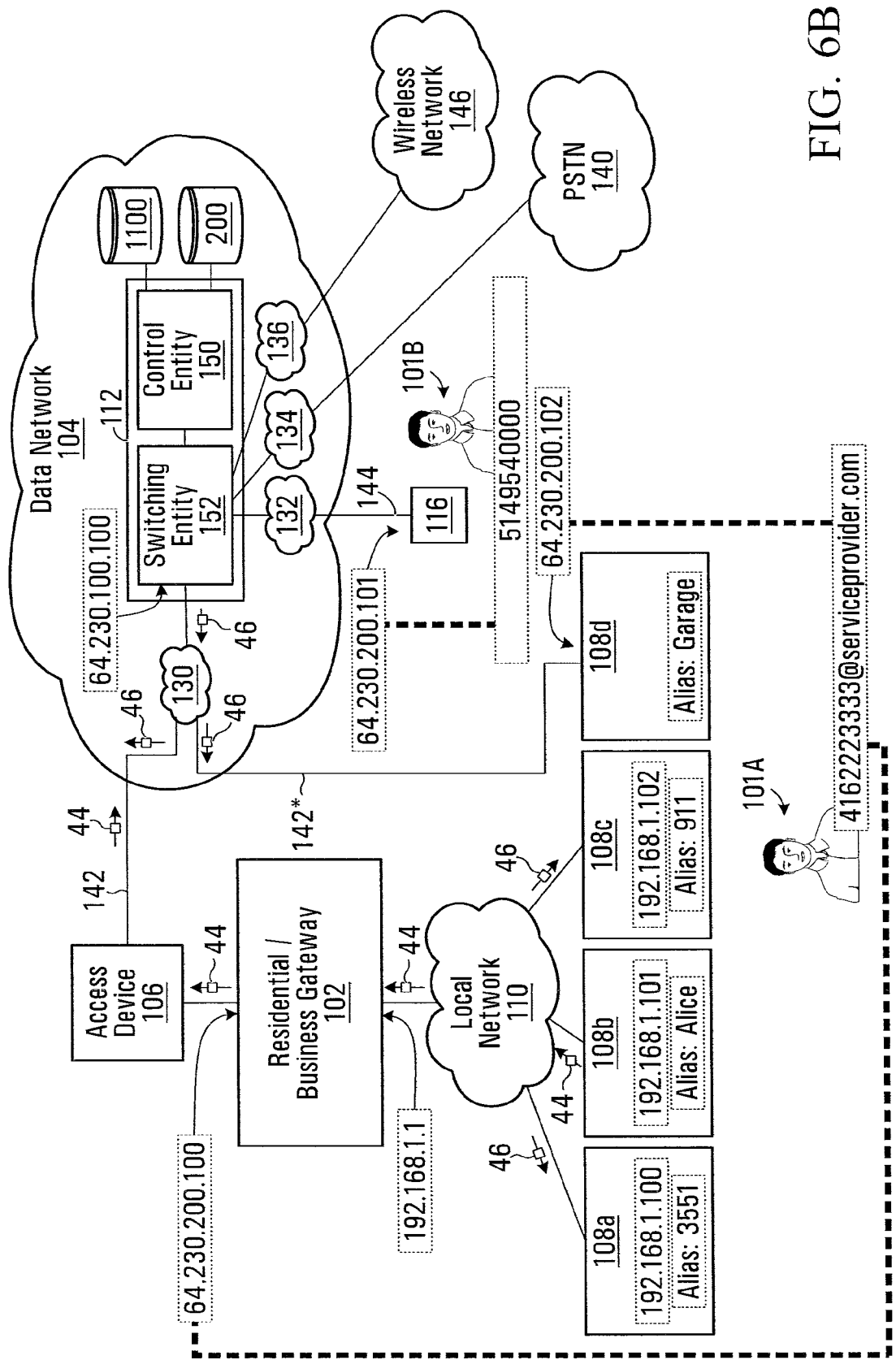

With specific reference now to FIG. 6B, consider that the intended recipients are one or more of the communication clients registered to the same customer as communication client 108B. Thus, communication client 108B attempts to reach these intended recipients in order to elicit any of them to take over the communication session 10 that has been placed in a held state. In order to invite these one or more communication clients (which in one embodiment may include all of communication clients 108A, 108C and 108D, but in an alternative embodiment can include a user-specific subset of one or more communication clients), communication client 108B can generate a paging message 44 destined for the control entity 150. The paging message 44 is intercepted by the residential/business gateway 102, which forwards the paging message 44 to the control entity 150.

Where the intended recipients include the totality of the communication clients registered to the same customer as communication client 108B, the control entity 150 consults the database 200 to determine that there are three other communication clients registered to customer 101A. In one non-limiting embodiment, the control entity 150 consequently sends an invitation 46 to each of communication clients 108A, 108C and 108D, thereby causing each of these communication clients to emit a perceptible signal in order to alert users proximate the respective communication client. In non-limiting examples, communication clients 108A, 108C and 108D can be caused to ring, vibrate or display a flashing or blinking indicator. Alternatively, where communication clients 108A, 108C and/or 108D are equipped with a loudspeaker, the invitation 46 may contain a voiceband signal which, when received by a given communication client, will be output over the loudspeaker.

Where the intended recipients include a user-specified subset of all of the communication clients registered to the same customer as communication client 108B, the paging message 44 (or similar) can identify this subset of communication clients. In a non-limiting embodiment, the control entity 150 sends the invitation 46 to each of the communication clients in the subset, thereby causing each of these communication clients to emit a perceptible signal in order to alert users proximate the respective communication client. In non-limiting examples, the communication clients in the subset can be caused to ring, vibrate or display a flashing or blinking indicator. Alternatively, where the communication clients in the subset are equipped with a loudspeaker, the invitation 46 may contain a voiceband signal which, when received by a given communication client, will be output over the loudspeaker.

As before, in some embodiments, the invitation 46 is a trigger that initiates the emission of the perceptible signal by a given communication clients, while in other embodiments, the invitation 46 is a signal that itself carries or encodes the perceptible signal. Where the invitation 46 does indeed carry or encode the perceptible signal, this perceptible signal may have been originally carried or encoded in the paging message 44 generated by communication client 108B, or it may have been created by the control entity 150 in response to receipt of the paging message 44 when the latter is in the form of a trigger.

Figure 6C:
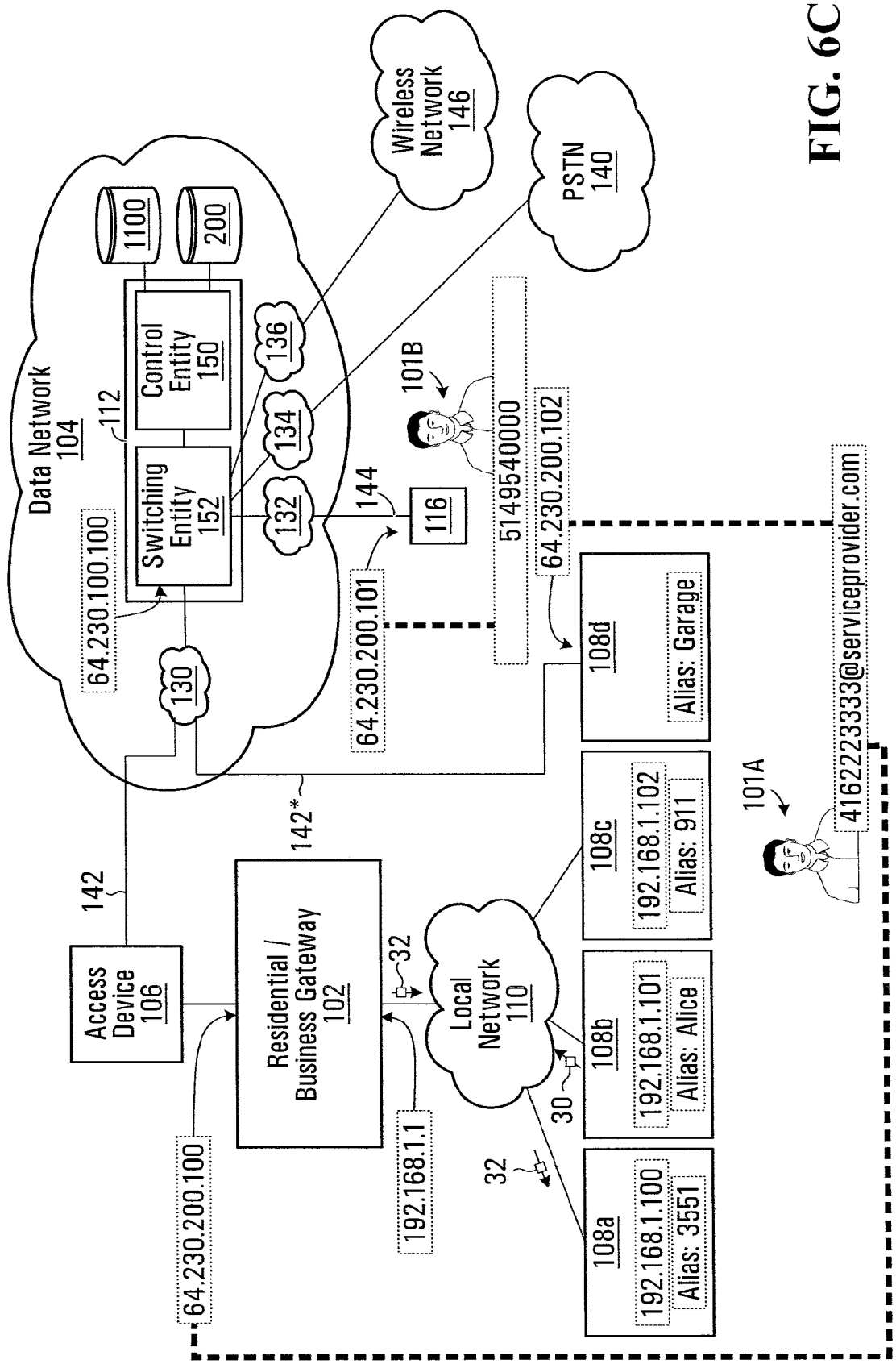

With specific reference now to FIG. 6C, consider that there is a single intended recipient and that it is a specific communication client which is locally connected via the local network 110) to communication client 108B, such as, say, communication client 108A. Thus, communication client 108B attempts to reach communication client 108A in order to invite the latter to take over the communication session 10 that has been placed in a held state. In order to invite communication client 108A, communication client 108B can generate a paging message 30 destined for the residential/business gateway 102 and specifying the private IP address associated with communication client 108A, which in the example above is 192.168.1.100. The paging message 30 arrives at the residential/business gateway 102, which has sufficient intelligence for extracting the address 192.168.1.100 and recognizing that this is the private IP address associated with communication client 108A.

In one non-limiting embodiment, the residential/business gateway 102 has sufficient intelligence to consequently send an invitation 32 to communication client 108A, which causes communication client 108A to emit a perceptible signal in order to alert a nearby user. In non-limiting examples, communication client 108A can be caused to ring, vibrate or display a flashing or blinking indicator. Alternatively, where communication client 108A is equipped with a loudspeaker, the invitation 32 may contain a voiceband signal which, when received by communication client 108A, will be output over the loudspeaker.

In some embodiments, the invitation 32 is a trigger that initiates the emission of the perceptible signal by communication client 108A, while in other embodiments, the invitation 32 is a signal that itself carries or encodes the perceptible signal. Where the invitation 32 does indeed carry or encode the perceptible signal, this perceptible signal may have been originally carried or encoded in the paging message 30 generated by communication client 108B, or it may have been created by the residential/business gateway 102 in response to receipt of the paging message 30 when the latter is in the form of a trigger.

It should also be understood that where the residential/business gateway 102 has local knowledge of the aliases associated with the various communication clients 108A, 108B, 108C, then communication client 108B may invite communication client 108A to take over the communication session 10 by dialing the alias of communication client 108A, which in this case is "3551". This alias would be recognized by the residential/business gateway 102, with the remainder of the steps being as described above.

Figure 6D:
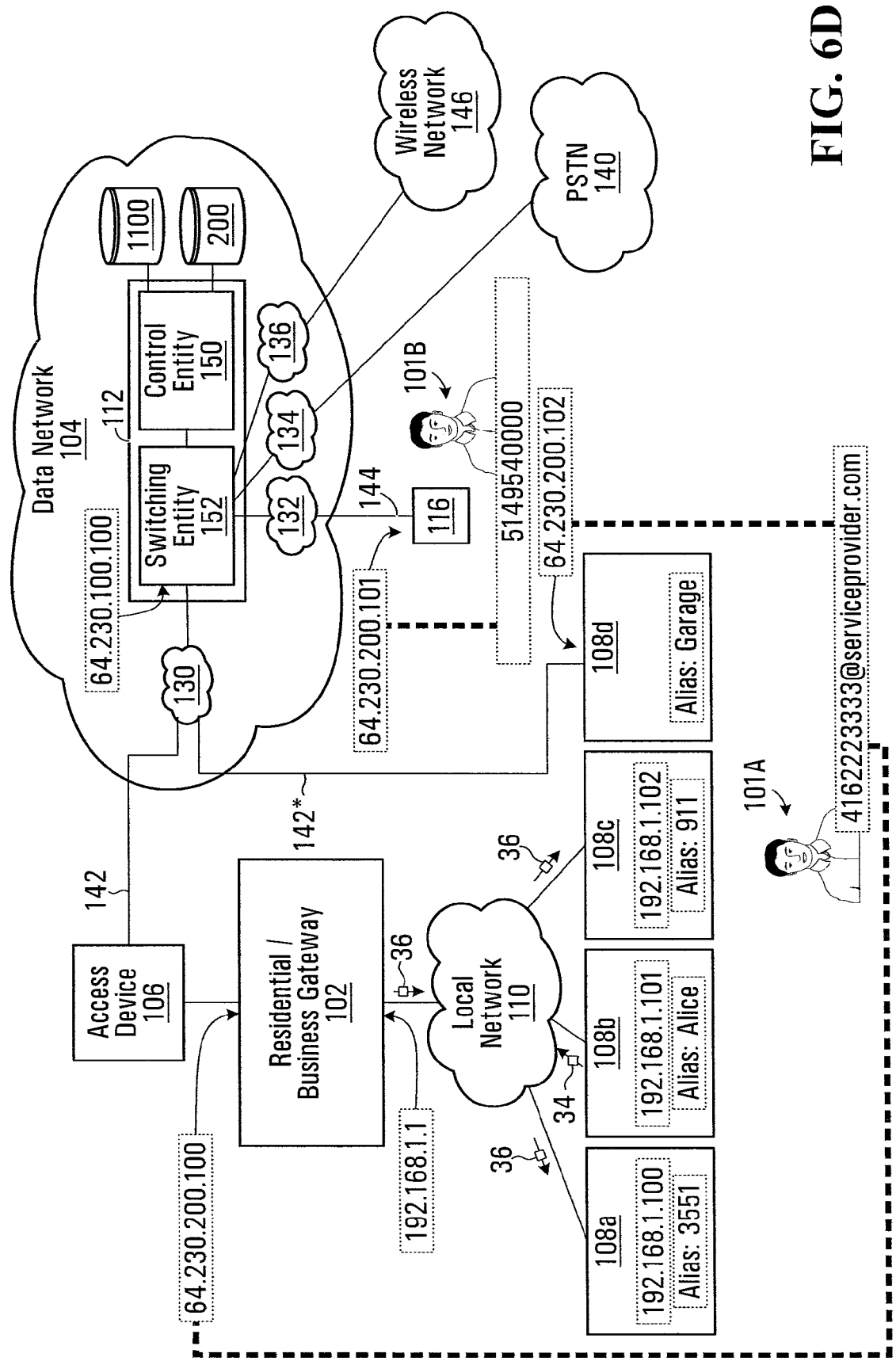

With specific reference now to FIG. 6D, consider that the intended recipients include one or more of the communication clients locally connected to communication client 108B. Thus, communication client 108B attempts to reach these intended recipients in order to elicit any of them to take over the communication session 10 that has been placed in a held state. In order to invite these one or more locally connected communication clients (which in this example include communication clients 108A and 108C), communication client 108B can generate a paging message 34 destined for the residential/business gateway 102. In the specific embodiment of FIG. 6D, the paging message 34 is intercepted by the residential/business gateway 102, which has sufficient intelligence for recognizing the significance of the paging message 34.

In one non-limiting embodiment, the residential/business gateway 102 has sufficient intelligence to identify the one or more intended recipients (in this case communication clients 108A and 108C) and to consequently send an invitation 36 thereto, thereby causing each of the intended recipients to emit a perceptible signal in order to alert users proximate the respective communication client. In non-limiting examples, communication clients 108A and 108C can be caused to ring, vibrate or display a flashing or blinking indicator. Alternatively, where communication client 108A and/or communication client 108C is equipped with a loudspeaker, the invitation 36 may contain a voiceband signal which, when received by either communication client, will be output over the loudspeaker.

As before, in some embodiments, the invitation 36 is a trigger that initiates the emission of the perceptible signal by communication client 108A and/or communication client 108C, while in other embodiments, the invitation 36 is a signal that itself carries or encodes the perceptible signal. Where the invitation 36 does indeed carry or encode the perceptible signal, this perceptible signal may have been originally carried or encoded in the paging message 34 generated by communication client 108B, or it may have been created by the residential/business gateway 102 in response to receipt of the paging message 34 when the latter is in the form of a trigger.

It should be understood that in the above embodiments, the paging messages 30, 34, 40 and 44 generated by communication client 108B need not be separate from the command 12 that was generated by communication client 108B in order to place the communication session 10 in a held state. Specifically, the command 12 may, but need not, include any of the paging messages 30, 34, 40, 44 described above. Similarly, the command 12* generated by a communication client other than a party to the communication session 10 may also include any of the paging messages 30, 34, 40, 44 described above.

Reference is now made to FIGS. 7A to 7D, which illustrate various non-limiting ways in which one party (the "inviting party") can cause the transmission of an invitation to retrieve a particular communication session that has been placed in a held state to one or more "intended recipients". In the examples to follow with reference to FIGS. 7A to 7D, there is a two-way media path established between the inviting party and an intended recipient that responds to the invitation. For simplicity, in each of the examples to follow, the particular communication session is the communication session 10 and the inviting party is communication client 108B, although this is not to be construed as a limitation of the present invention. The intended recipients will vary in different example situations, as is now described in greater detail.

Figure 7A:
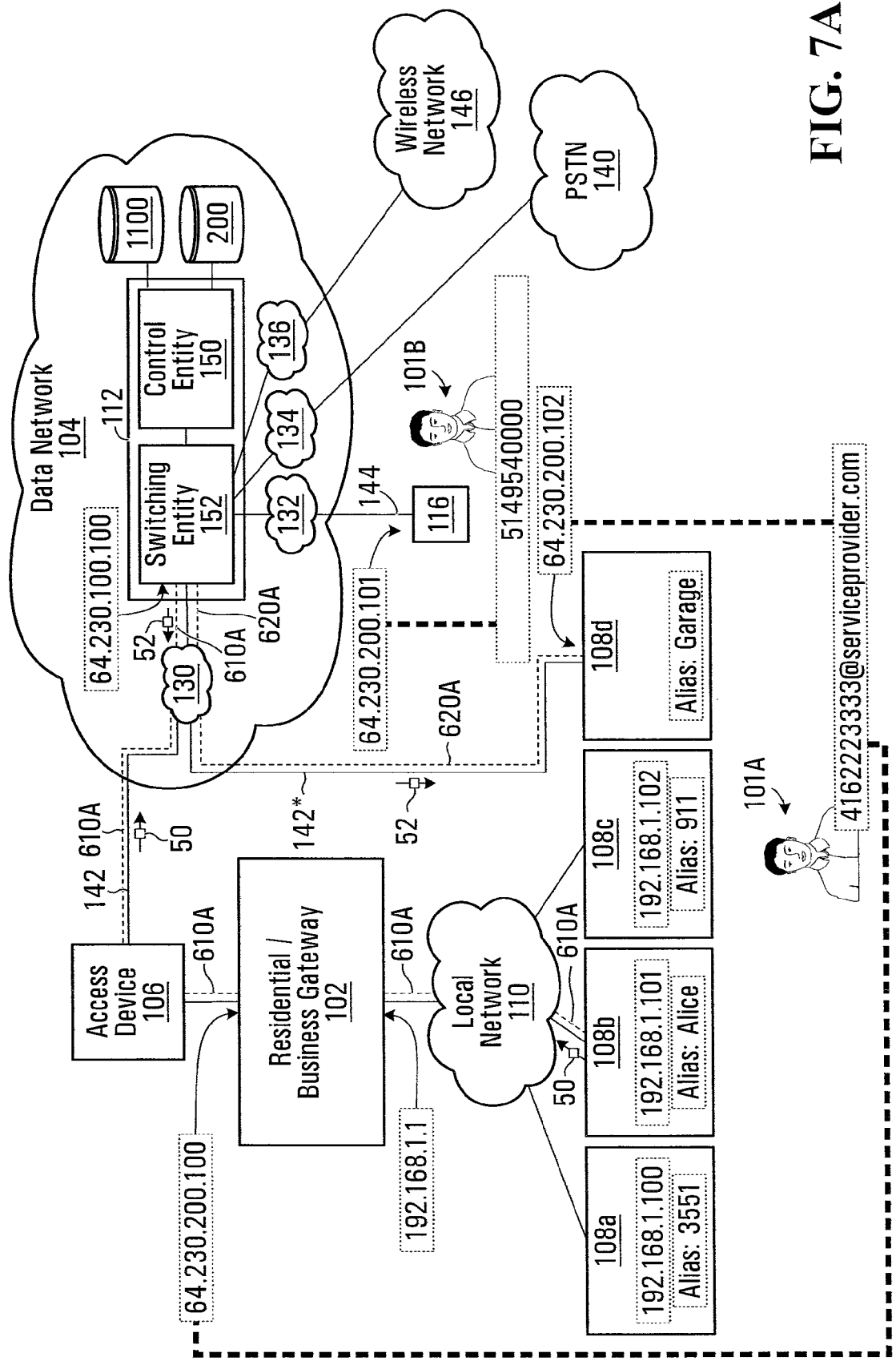
FIGS. 7A to 7D illustrate various example ways in which one party can invite one or more other parties to retrieve a particular communication session that has been parked, wherein there is a two-way media path established between the inviting party and an intended recipient that responds to an invitation from the inviting party.

With specific reference to FIG. 7A, consider that there is a single intended recipient and that it is a specific communication client registered to the same customer as communication client 108B, such as, say, communication client 108D. Consider that communication client 108B attempts to reach communication client 108D in order to invite it to take over the communication session 10 that has been placed in a held state as previously described. In order to invite communication client 108D, communication client 108B can generate a paging message 50 destined for the control entity 150 and specifying the alias associated with communication client 108D, which in the present example is "Garage". Upon receipt of the paging message 50, the residential/business gateway 102 forwards the paging message 40 to the control entity 150. The control entity 150 identifies customer 101A (based on the packets being received from communication client 108B) and consults the record 220 in the database 200 to determine that the alias "Garage" corresponds to the IP address 64.230.200.102. Meanwhile, a first media path leg 610A is established between communication client 108B and the network element 112.

In one non-limiting embodiment, the control entity 150 consequently sends an invitation 52 to communication client 108D, which causes communication client 108D to emit a perceptible signal in order to alert a nearby user. In non-limiting examples, communication client 108D can be caused to ring, vibrate or display a flashing or blinking indicator. Alternatively, where communication client 108D is equipped with a loudspeaker, the invitation 52 may contain a voiceband signal which, when received by communication client 108D, will be output over the loudspeaker.

In some embodiments, the command 52 is a trigger that initiates the emission of the perceptible signal by communication client 108D, while in other embodiments, the invitation 52 is a signal that itself carries or encodes the perceptible signal. Where the invitation 52 does indeed carry or encode the perceptible signal, this perceptible signal may have been originally carried or encoded in the paging message 50 generated by communication client 108B, or it may have been created by the control entity 150 in response to receipt of the paging message 50 when the latter is in the form of a trigger.

Consider now that the invitation 52 is responded to by the intended recipient, namely communication client 108D. Response to the invitation 52 can be conveyed by a user activating or grasping communication client 108D, pressing one or more keys, uttering a voice command, and so on. These acts are detectable by the control entity 150, which then proceeds to establish a second media path leg 620A between the network element 112 and communication client 108D. This is followed by bridging of the first and second media path legs 610A, 620A, resulting in an end-to-end media path between communication client 108D and communication client 108B. Along this end-to-end media path can be exchanged voice data or other media. For example, the user of communication client 108B can explain to the user of communication client 108D certain details about the communication session 10, such as the identity of the user of communication client 116. This may allow the user of communication client 108D to be better prepared for taking over the communication session 10 from the user of communication client 108B.

Figure 7B:
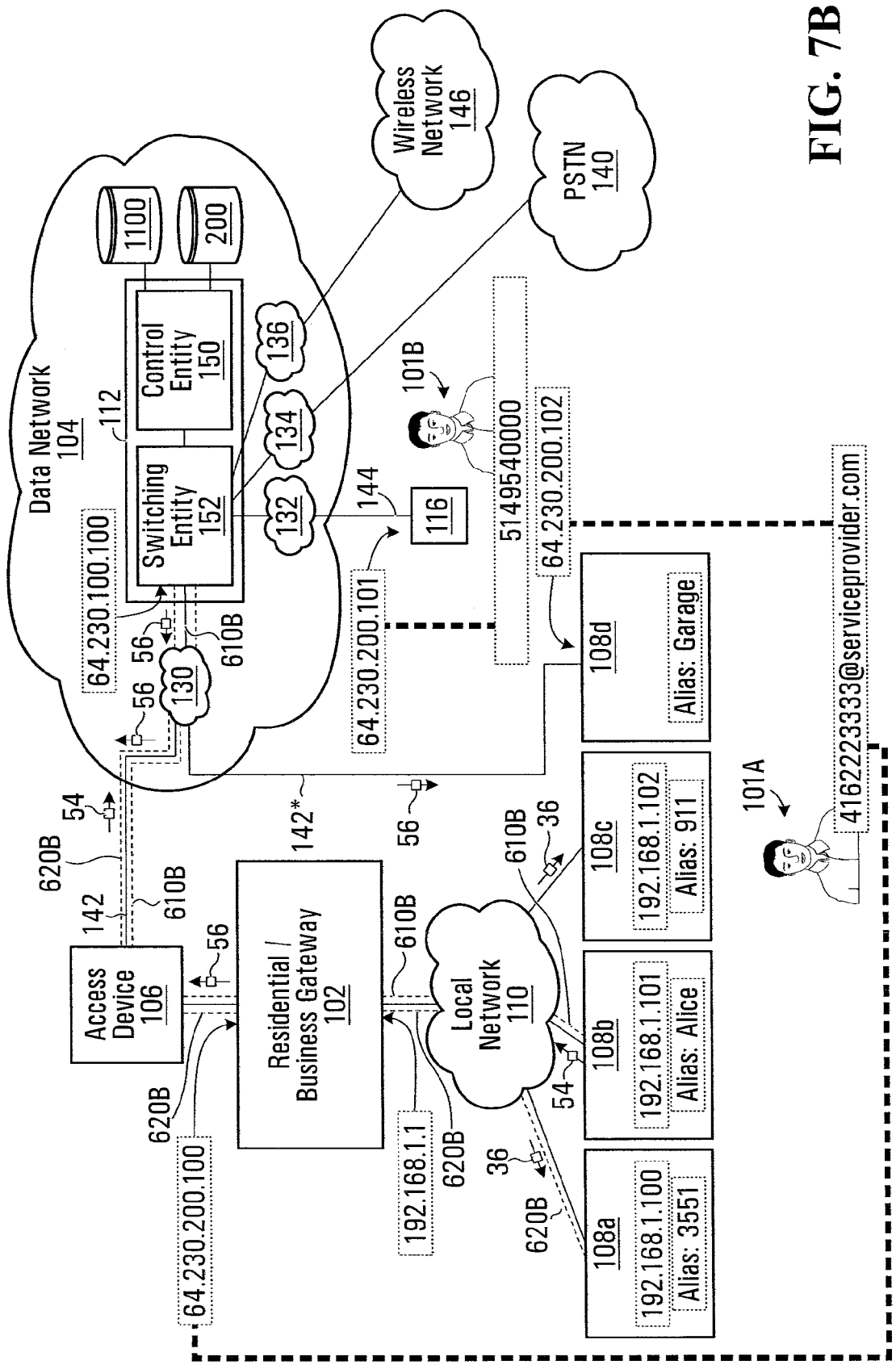

With specific reference now to FIG. 7B, consider that the intended recipients include one or more of the communication clients registered to the same customer as communication client 108B. Thus, communication client 108B attempts to reach these intended recipients in order to elicit any of them to take over the communication session 10 that has been placed in a held state. In order to invite these one or more communication clients (which in one embodiment may include all of communication clients 108A, 108C and 108D, but in an alternative embodiment can include a user-specific subset of one or more communication clients), communication client 108B can generate a paging message 54 destined for the control entity 150. The paging message 54 is intercepted by the residential/business gateway 102, which forwards the paging message 54 to the control entity 150. Meanwhile, a first media path leg 610B is established between communication client 108B and the network element 112.

Where the intended recipients include the totality of the communication clients registered to the same customer as communication client 108B, the control entity 150 consults the database 200 to determine that there are three other communication clients registered to customer 101A. In one non-limiting embodiment, the control entity 150 consequently sends an invitation 56 to communication clients 108A, 108C and 108D, thereby causing each of these communication clients to emit a perceptible signal in order to alert users proximate the respective communication client. In non-limiting examples, communication clients 108A, 108C and 108D can be caused to ring, vibrate or display a flashing or blinking indicator. Alternatively, where communication clients 108A, 108C and/or 108D are equipped with a loudspeaker, the invitation 56 may contain a voiceband signal which, when received by either communication client, will be output over the loudspeaker.

Where the intended recipients include a user-specified subset of all of the communication clients registered to the same customer as communication client 108B, the paging message 54 (or similar) can identify the subset of communication clients. In a non-limiting embodiment, the control entity 150 sends the invitation 56 to each of the communication clients in the subset, thereby causing each of these communication clients to emit a perceptible signal in order to alert users proximate the respective communication client. In non-limiting examples, the communication clients in the subset can be caused to ring, vibrate or display a flashing or blinking indicator. Alternatively, where the communication clients in the subset are equipped with a loudspeaker, the invitation 56 may contain a voiceband signal which, when received by a given communication client, will be output over the loudspeaker.

As before, in some embodiments, the invitation 56 is a trigger that initiates the emission of the perceptible signal by communication clients 108A, 108C and/or 108D, while in other embodiments, the invitation 56 is a signal that itself carries or encodes the perceptible signal. Where the invitation 56 does indeed carry or encode the perceptible signal, this perceptible signal may have been originally carried or encoded in the paging message 54 generated by communication client 108B, or it may have been created by the control entity 150 in response to receipt of the paging message 54 when the latter is in the form of a trigger.

Consider now that the invitation 56 is responded to by one of the intended recipients, say, communication client 108A. A response to the invitation 56 can be conveyed by a user activating or grasping communication client 108A, pressing one or more keys, uttering a voice command, and so on. These acts are detectable by the control entity 150, which then proceeds to establish a second media path leg 620B between the network element 112 and communication client 108A. This is followed by bridging of the first and second media path legs 610B, 620B, resulting in an end-to-end media path between communication client 108A and communication client 108B. Along this end-to-end media path can be exchanged voice data or other media. For example, the user of communication client 108B can explain to the user of communication client 108A certain details about the communication session 10, such as the identity of the user of communication client 116. This may allow the user of communication client 108A to be better prepared for taking over the communication session 10 from the user of communication client 108B.

Figure 7C:
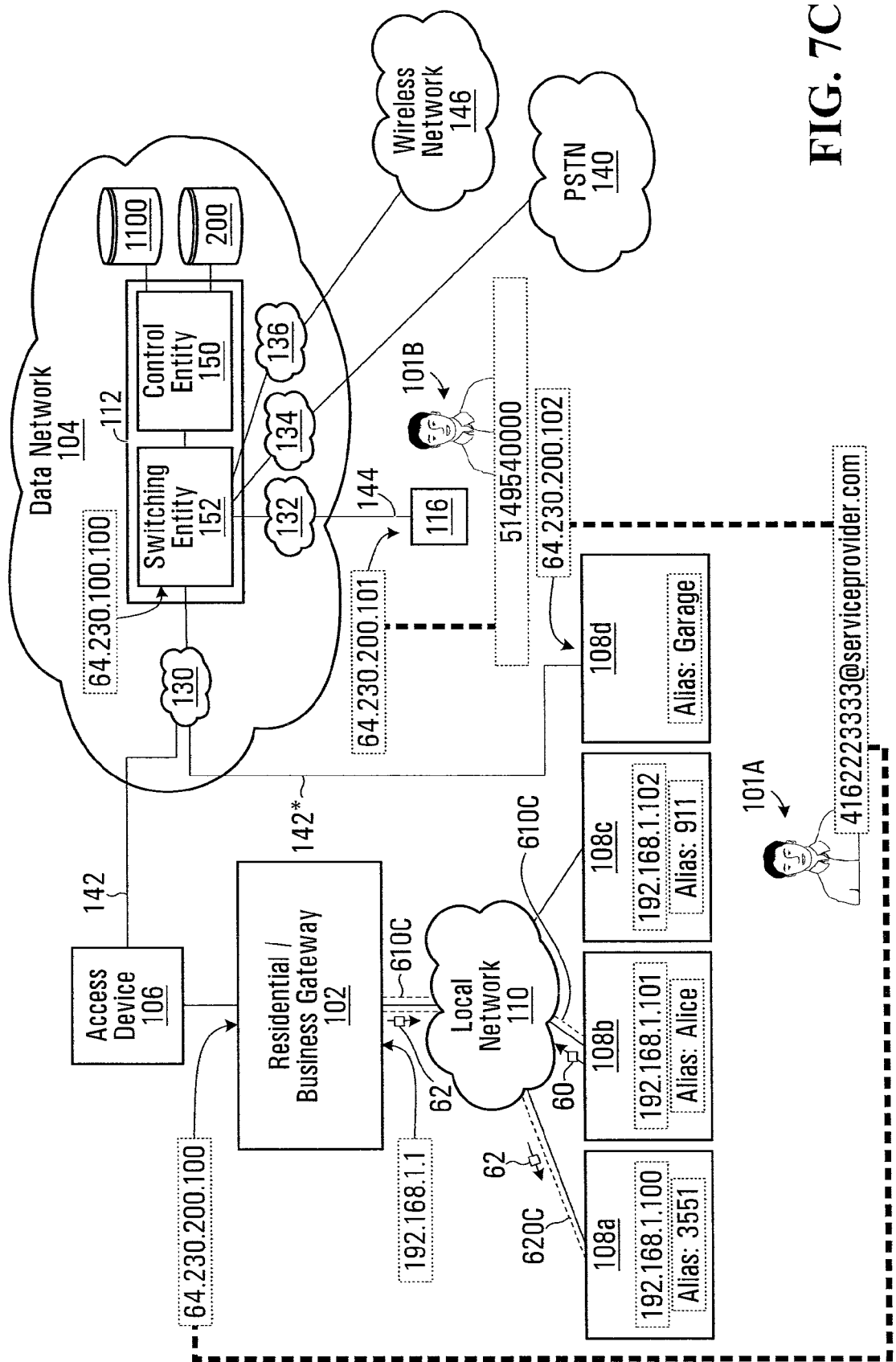

With specific reference now to FIG. 7C, consider that there is a single intended recipient and that it is a specific communication client locally connected (i.e., connected via the local network 110) to communication client 108B, such as, say, communication client 108A. Thus, communication client 108B attempts to reach communication client 108A in order to invite the latter to take over the communication session 10 that has been placed in a held state. In order to invite communication client 108A, communication client 108B can generate a paging message 60 destined for the residential/business gateway 102 and specifying the private IP address associated with communication client 108A, which in the example above is 192.168.1.100. The paging message 60 arrives at the residential/business gateway 102, which has sufficient intelligence for extracting the address 192.168.1.100 and recognizing that this is the private IP address associated with communication client 108A. Meanwhile, a first media path leg 610C is established between communication client 108B and the residential/business gateway 102.

In one non-limiting embodiment, the residential/business gateway 102 has sufficient intelligence to consequently send an invitation 62 to communication client 108A, which causes communication client 108A to emit a perceptible signal in order to alert a nearby user. In non-limiting examples, communication client 108A can be caused to ring, vibrate or display a flashing or blinking indicator. Alternatively, where communication client 108A is equipped with a loudspeaker, the invitation 62 may contain a voiceband signal which, when received by communication client 108A, will be output over the loudspeaker.

In some embodiments, the invitation 62 is a trigger that initiates the emission of the perceptible signal by communication client 108A, while in other embodiments, the invitation 62 is a signal that itself carries or encodes the perceptible signal. Where the invitation 62 does indeed carry or encode the perceptible signal, this perceptible signal may have been originally carried or encoded in the paging message 60 generated by communication client 108B, or it may have been carried or encoded by the residential/business gateway 102 in response to receipt of the invitation 60 when the latter is in the form of a trigger.

It should also be understood that where the residential/business gateway 102 has local knowledge of the aliases associated with the various communication clients 108A, 108B, 108C, then communication client 108B may invite communication client 108A to take over the communication session 10 by dialing the alias of communication client 108A, which in this case is "3551". This alias would be recognized by the residential/business gateway 102, with the remainder of the steps being as described above.

Consider now that the invitation 60 is responded to by the intended recipient, namely communication client 108A. Response to the invitation 60 can be conveyed by a user activating or grasping communication client 108A, pressing one or more keys, uttering a voice command, and so on. The residential/business gateway 102 has sufficient intelligence to detect these acts, and to establish a second media path leg 620C between the residential/business gateway 102 and communication client 108A. This is followed by bridging of the first and second media path legs 610C, 620C, resulting in a local media path between communication client 108A and communication client 108B via the residential/business gateway 102. Along this local media path can be exchanged voice data or other media. For example, the user of communication client 108B can explain to the user of communication client 108A certain details about the communication session 10, such as the identity of the user of communication client 116. This may allow the user of communication client 108A to be better prepared for taking over the communication session 10 from the user of communication client 108B.

Figure 7D:
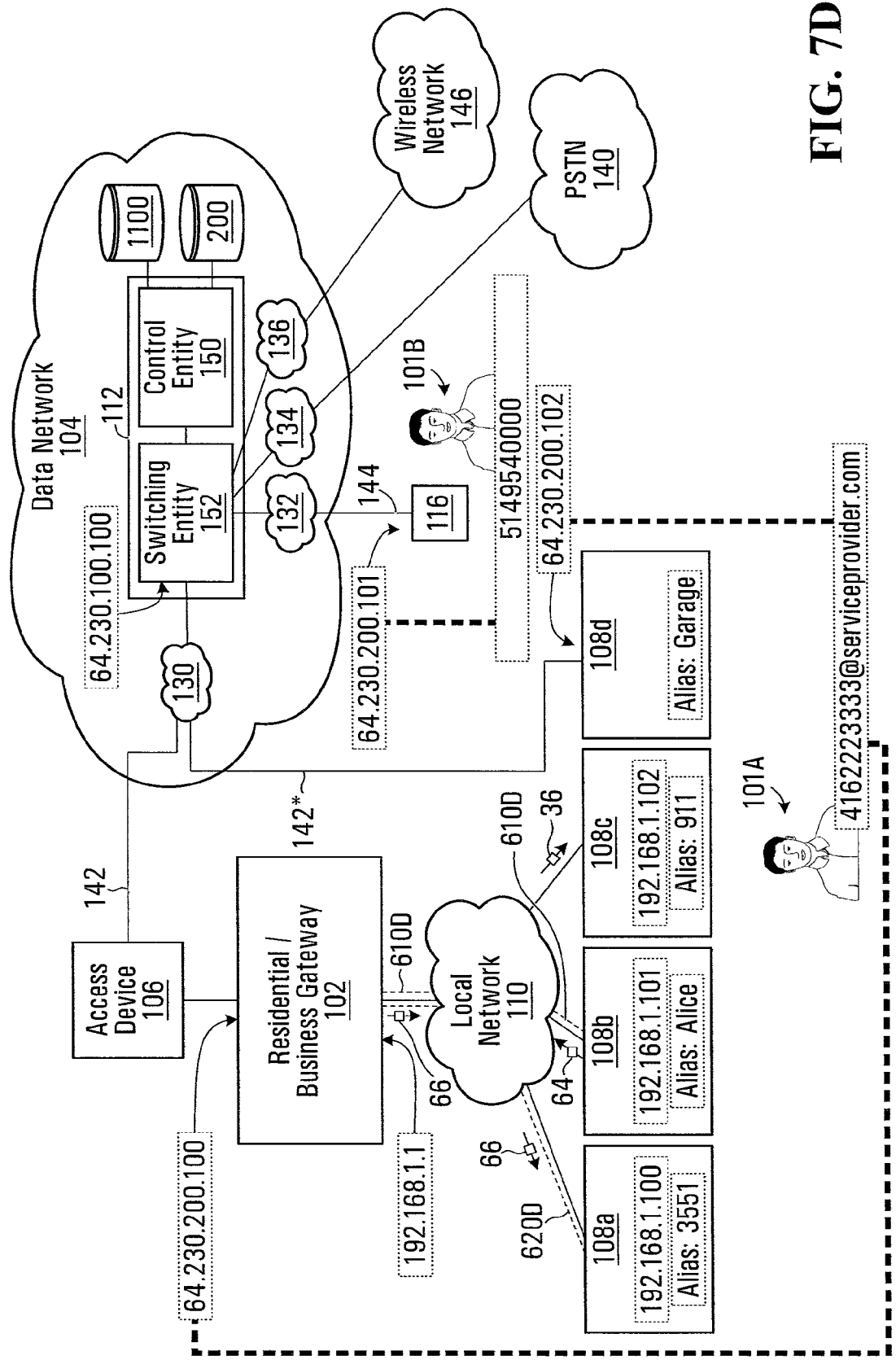

With specific reference now to FIG. 7D, consider that the intended recipients include one or more of the communication clients locally connected to communication client 108B. Thus, communication client 108B attempts to reach these intended recipients in order to elicit any of them to take over the communication session 10 that has been placed in a held state. In order to invite these one or more locally connected communication clients (which in this example include communication clients 108A and 108C), communication client 108B can generate a paging message 64 destined for the residential/business gateway 102. The paging message 64 is intercepted by the residential/business gateway 102, which has sufficient intelligence for recognizing the significance of the paging message 64. Meanwhile, a first media path leg 610D is established between communication client 108B and the residential/business gateway 102.

In one non-limiting embodiment, the residential/business gateway 102 has sufficient intelligence to identify the one or more intended recipients (in this case communication clients 108A and 108C) and to consequently send an invitation 66 thereto, thereby causing each of the intended recipients to emit a perceptible signal in order to alert users proximate the respective communication client. In non-limiting examples, communication clients 108A and 108C can be caused to ring, vibrate or display a flashing or blinking indicator. Alternatively, where communication client 108A and/or communication client 108C is equipped with a loudspeaker, the command 66 may contain a voiceband signal which, when received by either communication client, will be output over the loudspeaker.

As before, in some embodiments, the invitation 66 is a trigger that initiates the emission of the perceptible signal by communication client 108A and/or communication client 108C, while in other embodiments, the invitation 66 is a signal that itself carries or encodes the perceptible signal. Where the invitation 66 does indeed carry or encode the perceptible signal, this perceptible signal may have been originally carried or encoded in the paging message 64 generated by communication client 108B, or it may have been created by the residential/business gateway 102 in response to receipt of the paging message 64 when the latter is in the form of a trigger.

Consider now that the invitation 66 is responded to by one of the intended recipients, say, communication client 108A. Response to the invitation 66 can be conveyed by a user activating or grasping communication client 108A, pressing one or more keys, uttering a voice command, and so on. The residential/business gateway 102 has sufficient intelligence to detect these acts, and to establish a second media path leg 620D between the residential/business gateway 102 and communication client 108A. This is followed by bridging of the first and second media path legs 610D, 620D, resulting in a local media path between communication client 108A and communication client 108B via the residential/business gateway 102. Along this local media path can be exchanged voice data or other media. For example, the user of communication client 108B can explain to the user of communication client 108A certain details about the communication session 10, such as the identity of the user of communication client 116. This may allow the user of communication client 108A to be better prepared for taking over the communication session 10 from the user of communication client 108B.

It should be understood that in the above embodiments, the paging messages 50, 54, 60 and 64 generated by communication client 108B need not be separate from the command 12 generated by communication client 108B in order to place the communication session 10 in a held state. Specifically, the command 12 may, but need not, include any of the paging messages 50, 54, 60, 64 described above. Similarly, the command 12* generated by a communication client other than a party to the communication session 10 may also include any of the paging messages 50, 54, 60, 64 described above.

Also, where the intended recipients include a user-specified subset of one or more of the communication clients registered to the same customer as the inviting party, the control entity 150 may interact with the inviting party in order to provide the inviting party with a choice of potential recipients. The choice of potential recipients can be obtained by consulting the database 200 to determine the other communication clients registered to the same customer. The interaction can be of an audio, visual or multimedia nature, depending on the capabilities of the inviting party. For example, where the inviting party utilizes a telephony device with a computer-implemented user interface, the control entity 150 can cause the display of a list of potential recipients and can allow the inviting party to select a subset of one or more intended recipients via the user interface using an input device such as a touchscreen, keyboard, mouse or microphone.

No Invitation to Retrieve a Parked Communication Session

It should also be appreciated that once the communication session 10 has been placed in a held state, this fact may be conveyed to other relevant parties without the requirement for an invitation to any particular communication client. For example, consider the case where the person having placed the communication session 10 in a held state orally declares "Gina, your grandmother wants to have a word with you!" or "There's a call from the credit card company, someone pick it up!". Clearly, it is not necessary for a particular communication client to be specifically invited in order to make an attempt to retrieve a call that is in a held state. In fact, it cannot be guaranteed that when there is a communication session in a held state, and when a user of a communication client conveys an intent to communicate using this communication client, that this communication client has been invited to retrieve this call. Therefore, to ensure proper retrieval of parked communication sessions, it is within the scope of the present invention for the control entity 150 to execute a process for handling received indications of an intent to communicate using various ones of the communication clients registered to a given customer.

Retrieving a Parked Communication Session

Figure 8:
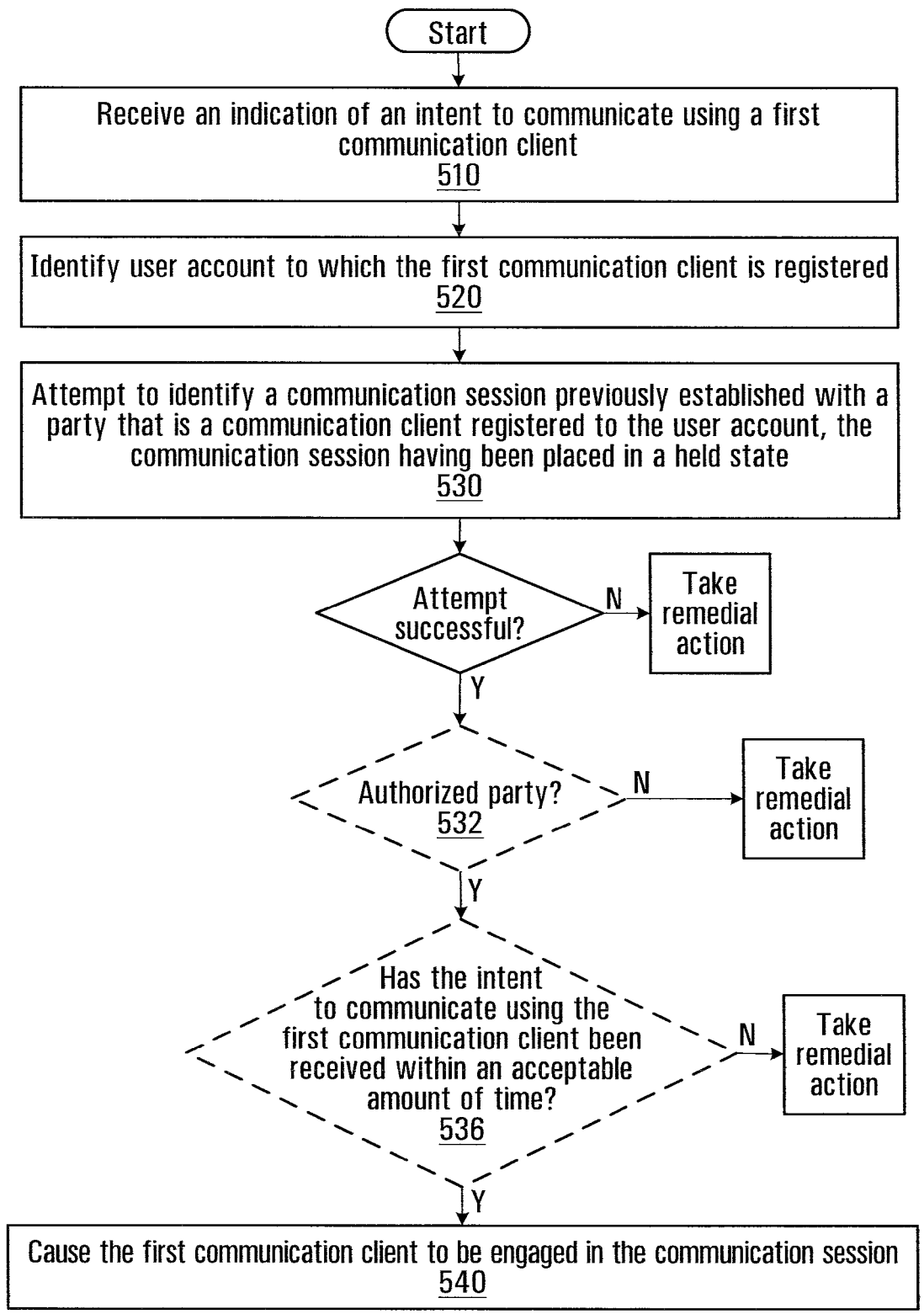
FIG. 8 is a flowchart illustrating an example of operation of a control entity of the network element when a user conveys an intent to communicate using a particular communication client in the context of retrieving a particular communication session that has been parked.

Accordingly, and with reference to FIG. 8, consider the scenario where a user conveys an intent to communicate using a particular communication client, in the context of retrieving a particular communication session that has been placed in a held state (in this case, let this be the communication session 10). In the types of situations being considered in this specific case, at the time when the user in question wishes to convey an intent to communicate using the particular communication client, the latter is already involved in an exchange over a media path that traverses the network element 112, such media path having been established in response to an invitation sent by an inviting party (in this case, let this be communication client 108B) after the communication session 10 has been placed in a held state.

For example, as described with reference to FIG. 7A above where the particular communication client would be communication client 108D, the user of communication client 108D may be in the process of conferring with the user of communication client 108B over the end-to-end media path made up of media path legs 610A and 620A in order to decide whether or not he/she should retrieve the communication session 10. Analogously, as described with reference to FIG. 7B above where the particular communication client would be communication client 108A, the user of communication client 108A may be in the process of conferring with the user of communication client 108B over the end-to-end media path made up of media path legs 610B and 620B in order to decide whether or not he/she should retrieve the communication session 10.

In such situations, while the user of the communication client 108D (or 108A) is "on the line" with the user of communication client 108B over an end-to-end media path that traverses the network element 112, the intent to communicate using communication client 108D (or 108A) can be conveyed by pressing one or more keys, uttering a voice command, and so on. Such actions cause communication client 108D (or 108A) to release an indication of the intent to communicate. This indication can travel over the second media path leg 620A (or 620B) between communication client 108D (or 108A) and the network element 112, or it can travel along an independent signaling path.

At step 510, the control entity 150 receives the aforesaid indication of the intent to communicate using communication client 108D (or 108A).

At step 520, the control entity 150 identifies the customer to which communication client 108D (or 108A) is registered, which is in this case customer 101A. Given the existence of the second media path leg 620A (or 620B) already established between the network element 112 and communication client 108D (or 108A), the identity of customer 101A can be determined without difficulty.

At step 530, the control entity 150 consults database 1100 in an attempt to identify a communication session (I) that has been previously established with a party that is a communication client registered to the customer 101A (hereinafter referred to as a "previously participating party"), and (II) such communication session has been "parked", i.e., placed in a held state. In the present non-limiting example, the control entity 150 consults record 1110, for which the customer field 1140 specifies customer 101A. It is noted that the "parked communication session identifier" field 1180 contains an entry (in this case comprising a session identifier of the communication session 10 that had been temporarily curtailed), and that the corresponding entry in the "previously participating party" field 1150 of record 1110 identifies communication client 108B.

At step 540, provided that the control entity 150 has succeeded in identifying a communication session at step 530, the control entity 150 takes steps to engage communication client 108D (or 108A) in that communication session. However, before this can be completed, the first media path leg 610A, 610B (between communication client 108B and the network element 112) needs to be terminated—unless it is spontaneously terminated in the meantime. Thus, the control entity 150 sends control instructions to the switching entity 152 in order to terminate the first media path leg 610A, 610B. The control entity 150 sends further control instructions to the switching entity 152 in order to bridge the corresponding second media path leg 620A, 620B (i.e., the portion between communication client 108D (or 108A) and the network element 112) to the first media path leg 10A of the communication session 10 (i.e., the portion between communication client 116 and the network element 112). Communication client 108D (or 108A) thus retrieves the communication session and is thus placed in communication with communication client 116.

With reference again to FIG. 8, consider an alternate scenario where a user conveys an intent to communicate using a particular communication client (in this case, let this be communication client 108A), in the context of retrieving a particular communication session that has been placed in a held state (in this case, let this be the communication session 10). In the types of situations being considered in this specific case, at the time when the user wishes to convey an intent to communicate using the communication client 108A, there is no media path between communication client 108A and any other communication client through network element 112.

For example, the absence of a media path could be the result of the user of communication client 108A having recently terminated such a media path previously established in response to an invitation sent by an inviting party. Such a previously established media path may have been the end-to-end media path made up of media path legs 610B, 620B that traverses the network element 112, or any of the local media paths (see FIGS. 7C and 7D) that do not traverse the network element 112. In still other situations, the absence of a media path could be due to the fact that communication client 108A may have been invited by virtue of a one-way message from an inviting party, e.g., in the manner described above with reference to FIGS. 6A through 6D. In yet other situations, the absence of a media path could be due to the complete absence of any invitation in the first place.

In the types of situations being considered here, the intent to communicate using the communication client 108A can be conveyed in a variety of different ways, for example by activating or grasping the communication client 108A, pressing one or more keys, uttering a voice command, and so on. Such actions cause the communication client 108A to release an indication of the intent to communicate, e.g., in the form of one or more packets. This indication can travel along a signaling path between communication client 108A and the network element 112.

At step 510, the control entity 150 receives the aforesaid indication of the intent to communicate using communication client 108A.

At step 520, the control entity 150 identifies the customer to which communication client 108A is registered, which is in this case customer 101A. For example, in the present non-limiting example, the control entity 150 receives address information indicative of the intent to communicate using communication client 108A, in which case the control entity 150 consults the database 200 on the basis of the address information in order to identify the customer in question as customer 101A.

At step 530, which is identical to step 530 described above, the control entity 150 consults database 1100 in an attempt to identify a communication session (I) that has been previously established with a party that is a communication client registered to the customer 101A (hereinafter referred to as a "previously participating party"), and (II) such communication session has been "parked", i.e., placed in a held state. In the present non-limiting example, the control entity 150 consults record 1110, for which the customer field 1140 specifies customer 101A. It is noted that the "parked communication session identifier" field 1180 contains an entry (in this case comprising a session identifier of the communication session 10 that had been temporarily curtailed), and that the corresponding entry in the "previously participating party" field 1150 of record 1110 identifies communication client 108B.

At step 540, provided that the control entity 150 has succeeded in identifying a communication session at step 530, the control entity 150 takes steps to engage communication client 108A in that communication session. Specifically, given the absence of an existing media path between the network element 112 and the communication client 108A, the control entity 150 sends control instructions to the switching entity 152 in order to establish such a media path. The control entity 150 sends further control instructions to the switching entity 152 in order to bridge the aforesaid media path (i.e., between communication client 108A and the network element 112) to the first media path leg 10A of the communication session 10 (i.e., the portion between communication client 116 and the network element 112). This allows communication client 108A to retrieve the communication session and be placed communication with communication client 116.

Various optional steps may be provided in FIG. 8. For example, at step 532, the control entity 150 may check for the existence of an "authorized party" having an exclusive right to retrieve the communication session identified at step 530. Specifically, the control entity 150 consults record 1110, and more specifically the "authorized party" field 1170. Upon determining that there indeed is an entry in this field, this would signify that there is a communication client registered to customer 101A (and/or an individual) that has the exclusive right to retrieve the communication session identified at step 530.

Thus, in one case, the control entity 150 proceeds to compare the address information associated with the communication client identified in the "authorized party" field 1170 and the address information associated with communication client 108A from which the indication of the intent to communicate was received at step 510. In another case, the control entity 150 then proceeds to compare the code (e.g., PIN number) in the "authorized party" field 1170 with a PIN number received from communication client 108A at step 510 along with the intent to communicate.

If there is a match, then the control entity 150 proceeds to step 540 as previously described. However, if there is no match, then the control entity 150 does not proceed to engage communication client 108B at step 510 in the communication session identified at step 530.

Also optionally, at step 536, the control entity 150 may check whether the intent to communicate has been received within an acceptable amount of time before proceeding to step 540. Specifically, the control entity 150 consults record 1110, and more specifically the "time to pick-up" field 1160. Upon determining that there indeed is an entry in this field, this would signify that there is a maximum amount of time that the communication session identified at step 530 is allowed to persist in a held state, that is, an amount of time within which the communication session identified at step 530 has to be retrieved. The control entity 150 then proceeds to compare how much time has elapsed since the communication session identified at step 530 has been placed in a held state. A timer (not shown) may be used for this purpose. If the elapsed time is within the time specified in the "time to pick-up" field 1160, then the control entity 150 proceeds to step 540 as previously described. However, if the elapsed time is greater than the time specified in the "time to pick-up" field 1160, then the control entity 150 does not proceed to engage communication client 108A at step 540 in the communication session identified at step 530. In this case, certain remedial action may be taken, such as to ring back (i.e., invite) the communication client identified in the "previously participating party" field 1150, re-invite all previous intended recipients, terminate the communication session 10, etc.

It should be mentioned that when conveying an intent to communicate using a given communication client, the user of the given communication client may or may not be responding to an explicit invitation to retrieve a parked communication session. Thus, it will be understood that the given communication client may (but need not) be a communication client having been caused to emit a perceptible signal further to generation of a command from an inviting party.

It should further be appreciated that it is within the scope of the present invention for the communication client being used to convey an intent to communicate to indeed be the same as the communication client that caused a given communication session to be placed in a held state. In other words, the communication client originally involved in the communication session and which has parked the given communication session may also be allowed to retrieve the given communication session.

Thus, a system and methods by which a user of a communication client can retrieve a parked communication session has been described and illustrated. Moreover, the communication session can be retrieved without having to explicitly identify the communication session to be retrieved. Rather, a desire to retrieve the communication session is implied from the fact that the communication client is registered to the same customer as the customer with whom the communication session had been established prior to being placed in a held state. This facilitates the manner in which parked calls can be retrieved, particularly in a small business or residential environment.

Those skilled in the art will appreciate that in some embodiments, the functionality of the control entity 150 may be implemented using pre-programmed hardware or firmware elements (e.g., application specific integrated circuits (ASICs), electrically erasable programmable read-only memories (EEPROMs), etc.), or other related components. In other embodiments, the functionality of the control entity 150 may be achieved using a computing apparatus that has access to a code memory (not shown) which stores computer-readable program code for operation of the computing apparatus. The computer-readable program code could be stored on a medium which is fixed, tangible and readable directly by the control entity 150, (e.g., removable diskette, CD-ROM, ROM, fixed disk, USB drive), or the computer-readable program code could be stored remotely but transmittable to the control entity 150 via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Of course, the above described embodiments are intended to be illustrative only and in no way limiting. The described embodiments are susceptible to many modifications of form, arrangement of parts, details and order of operation. The invention, rather, is intended to encompass all such modifications within its scope, as defined by the claims.

What is claimed is:
1. A method, comprising:
   receiving an indication of an intent to communicate using a first communication client registered to a user account;
   consulting a memory in an attempt to identify a communication session previously established with a party that is a communication client registered to said user account, said communication session having been placed in a held state; and
   engaging the first communication client in said communication session if said attempt is successful.
2. The method defined in claim 1, wherein said party is the first communication client.
3. The method defined in claim 1, wherein said party is different from the first communication client.
4. The method defined in claim 3, wherein each of said party and said first communication client comprises one of a PSTN telephone, a mobile phone, a 'VoIP' phone and a computer running a vow soft client.
5. The method defined in claim 1, further comprising receiving a command to place said communication session in a held state.
6. The method defined in claim 5, further comprising placing the communication session in a held state in response to receipt of said command.
7. The method defined in claim 6, wherein said command comprises an identification of the communication session.
8. The method defined in claim 6, wherein said command is received from a particular communication client registered to said user account.
9. The method defined in claim 6, further comprising receiving said command from said party.
10. The method defined in claim 9, wherein said command is in band or in parallel with the communication session.
11. The method defined in claim 6, further comprising receiving said command from a particular communication client registered to said user account other than said party.
12. The method defined in claim 1, further comprising transmitting to the first communication client an invitation to retrieve the communication session.
13. The method defined in claim 12, wherein transmitting said invitation occurs in response to receipt of a paging message issued by said party.
14. The method defined in claim 12, wherein receipt of said indication of an intent to communicate occurs after transmitting said invitation.
15. The method defined in claim 14, wherein said invitation has a single intended recipient.
16. The method defined in claim 15, wherein the single intended recipient is the first communication client.
17. The method defined in claim 16, further comprising receiving an indication of said single intended recipient.
18. The method defined in claim 17, further comprising interacting with said party to receive the indication of said single intended recipient.
19. The method defined in claim 18, wherein the indication of said single intended recipient comprises an alias.
20. The method defined in claim 13, wherein receipt of said paging message occurs over a media path established with said party.
21. The method defined in claim 20, further comprising receiving an indication of termination of said media path.
22. The method defined in claim 21, wherein receipt of said indication of termination of said media path follows transmission of said invitation.
23. The method defined in claim 22, wherein said engaging is conditional upon receipt of said indication of termination.
24. The method defined in claim 1, further comprising transmitting to multiple intended recipients an invitation to retrieve the communication session.
25. The method defined in claim 24, wherein transmitting said invitation occurs in response to receipt of a paging message issued by said party.
26. The method defined in claim 24, wherein said multiple intended recipients include a plurality of communication clients registered to said user account.
27. The method defined in claim 26, further comprising receiving an indication of said multiple intended recipients.
28. The method defined in claim 27, further comprising interacting with said party to receive the indication of said multiple intended recipients.
29. The method defined in claim 28, wherein the plurality of communication clients registered to said user account includes the first communication client.
30. The method defined in claim 25, wherein receipt of said paging message occurs over a media path established with said party.
31. The method defined in claim 30, further comprising receiving an indication of termination of said media path.

32. The method defined in claim 31, wherein receipt of said indication of termination of said media path follows transmission of said invitation.

33. The method defined in claim 32, wherein said engaging is conditional upon receipt of said indication of termination.

34. The method defined in claim 12, wherein transmitting to the first communication client said invitation to retrieve the communication session comprises causing a perceptible effect at the first communication client.

35. The method defined in claim 34, wherein said perceptible effect is an audible effect.

36. The method defined in claim 34, wherein said causing a perceptible effect at the first communication client comprises causing the first communication client to ring.

37. The method defined in claim 34, wherein said causing a perceptible effect at the first communication client comprises causing a voiceband message to be output over a speaker associated with the first communication client.

38. The method defined in claim 34, wherein said perceptible effect is a visual effect.

39. The method defined in claim 38, wherein said visual effect is achieved by a flashing or blinking indicator.

40. The method defined in claim 34, wherein said causing a perceptible effect at the first communication client comprises causing the first communication client to vibrate.

41. The method defined in claim 1, further comprising consulting a second memory to determine whether the user account subscribes to a call park feature and effecting said engaging only if said user account is determined to subscribe to the call park feature.

42. The method defined in claim 1, further comprising determining whether the first communication client is authorized to retrieve the communication session and wherein said engaging is conditional upon said first communication client being authorized to retrieve the communication session.

43. The method defined in claim 42, wherein determining whether the first communication client is authorized to retrieve the communication session comprises consulting a memory that associates an identifier of the communication session with a set of authorized communication clients.

44. The method defined in claim 1, further comprising determining whether a user of the first communication client is authorized to retrieve the communication session and wherein said engaging is conditional upon said first communication client being authorized to retrieve the communication session.

45. The method defined in claim 44, wherein determining whether the user of the first communication client is authorized to retrieve the communication session comprises consulting a memory that associates an identifier of the communication session with a set of authorized users.

46. The method defined in claim 1, further comprising:
consulting a second memory to determine a maximum amount of time that the communication session is allowed to persist in a held state;
determining an actual amount of time since the communication session has been placed in a held state; and
effecting said engaging only if the actual amount of time is no greater than the maximum amount of time.

47. The method defined in claim 46, further comprising: attempting to reach said party if the actual amount of time exceeds the maximum amount of time.

48. The method defined in claim 46, further comprising: terminating the communication session if the actual amount of time exceeds the maximum amount of time.

49. A non-transitory computer-readable medium comprising computer-readable program code which, when interpreted by a computing apparatus, causes the computing apparatus to execute a method, the computer-readable program code comprising:
first computer-readable program code for causing the computing apparatus to be attentive to receipt of an indication of an intent to communicate using a first communication client registered to a user account;
second computer-readable program code for causing the computing apparatus to consult a memory in an attempt to identify a communication session previously established with a party that is a communication client registered to said user account, said communication session having been placed in a held state; and
third computer-readable program code for causing the computing apparatus to engage the first communication client in said communication session if said attempt is successful.

50. A network element comprising a control entity configured for receiving an indication of an intent to communicate using a first communication client registered to a user account; consulting a memory in an attempt to identify a communication session previously established with a party that is a communication client registered to said user account, said communication session having been placed in a held state; and engaging the first communication client in said communication session if said attempt is successful.

51. A system, comprising:
a plurality of networked communication clients registered to a common user account;
a network element communicatively coupled to the communication clients, the network element comprising a control entity configured for receiving an indication of an intent to communicate using a first communication client that is one of said communication clients; consulting a memory in an attempt to identify a communication session previously established with a party that is one of said communication clients, said communication session having been placed in a held state; and engaging the first communication client in said communication session if said attempt is successful.

52. The system defined in claim 51, wherein said party is the first communication client.

53. The system defined in claim 51, wherein said party is different from the first communication client.

54. The system defined in claim 53, wherein said plurality of communication clients comprises communication devices selected from the group consisting of: PSTN telephones, mobile phones, a VoIP phones and computers running respective VoIP soft clients.

55. The system defined in claim 51, further comprising a gateway configured to route to the control entity a command to place said communication session in a held state.

56. The system defined in claim 55, the control entity being further configured to place the communication session in a held state in response to receipt of said command.

57. The system defined in claim 56, wherein the command is sent by a particular one of the communication clients.

58. The system defined in claim 56, wherein said command comprises an identification of the communication session.

59. The system defined in claim 56, wherein the command is sent by said party.

60. The system defined in claim 56, wherein the command is sent by a particular one of the locally connected communication clients other than said party.

61. The system defined in claim 51, further comprising a gateway configured to transmit to the first communication client an invitation to retrieve the communication session.

62. The system defined in claim 61, wherein transmission of said invitation occurs in response to the gateway receiving a paging message issued by said party.

63. The system defined in claim 61, wherein receipt by the control entity of said indication of an intent to communicate occurs after transmission of said invitation by the gateway.

64. The system defined in claim 63, wherein said invitation as a single intended recipient.

65. The system defined in claim 64, wherein the single intended recipient is the first communication client.

66. The system defined in claim 65, wherein the control entity is further configured to receive an indication of said single intended recipient.

67. The system defined in claim 66, wherein the control entity is further configured to interact with said party to receive the indication of said single intended recipient.

68. The system defined in claim 67, wherein the indication of said single intended recipient comprises an alias.

69. The system defined in claim 62, further comprising a media path established with said party over which receipt of said paging message occurs.

70. The system defined in claim 69, the control entity being further configured to receive an indication of termination of said media path.

71. The system defined in claim 70, wherein receipt of said indication of termination of said media path follows transmission of said invitation.

72. The system defined in claim 71, wherein the control entity is further configured to effect said engaging conditional upon receipt of said indication of termination.

73. The system defined in claim 51, further comprising a gateway configured to transmit to multiple intended recipients an invitation to retrieve the communication session.

74. The system defined in claim 73, wherein transmission of said invitation occurs in response to the gateway receiving a paging message issued by said party.

75. The system defined in claim 73, wherein said multiple intended recipients include a plurality of communication clients registered to said user account.

76. The system defined in claim 75, wherein the control entity is further configured to receive an indication of said multiple intended recipients.

77. The system defined in claim 76, wherein the control entity is further configured to interact with said party to receive the indication of said multiple intended recipients.

78. The system defined in claim 77, wherein the plurality of communication clients registered to said user account includes the first communication client.

79. The system defined in claim 74, further comprising a media path established with said party over which receipt of said paging message occurs.

80. The system defined in claim 79, the control entity being further configured to receive an indication of termination of said media path.

81. The system defined in claim 80, wherein receipt of said indication of termination of said media path follows transmission of said invitation.

82. The system defined in claim 81, wherein the control entity is further configured to effect said engaging conditional upon receipt of said indication of termination.

83. The system defined in claim 61, wherein transmission of said invitation to retrieve the communication session causes a perceptible effect at the first communication client.

84. The system defined in claim 83, wherein said perceptible effect is an audible effect.

85. The system defined in claim 84, wherein said perceptible effect comprises at least one of a ringing sound, a voiceband message output over a speaker, a visual effect, a flashing or blinking indicator and a vibration.

86. The system defined in claim 51, the control entity being further configured to consult a second memory to determine whether the user account subscribes to a call park feature and to effect said engaging only if said user account is determined to subscribe to the call park feature.

87. The system defined in claim 51, the control entity being further configured to determine whether the first communication client is authorized to retrieve the communication session and wherein said engaging is conditional upon said first communication client being authorized to retrieve the communication session.

88. The system defined in claim 87, wherein to determine whether the first communication client is authorized to retrieve the communication session, the control entity is configured to consult a memory that associates an identifier of the communication session with a set of authorized communication clients.

89. The system defined in claim 51, the control entity being further configured to determine whether a user of the first communication client is authorized to retrieve the communication session and wherein said engaging is conditional upon said first communication client being authorized to retrieve the communication session.

90. The system defined in claim 89, wherein to determine whether the user of the first communication client is authorized to retrieve the communication session, the control entity is configured to consult a memory that associates an identifier of the communication session with a set of authorized users.

91. The system defined in claim 51, the control entity being further configured to:
consult a second memory to determine a maximum amount of time that the communication session is allowed to persist in a held state;
determine an actual amount of time since the communication session has been placed in a held state; and
effect said engaging only if the actual amount of time is no greater than the maximum amount of time.

92. The system defined in claim 91, the control entity being further configured to attempt to reach said party if the actual amount of time exceeds the maximum amount of time.

93. The system defined in claim 91, control entity being further configured to terminate the communication session if the actual amount of time exceeds the maximum amount of time.

94. A method, comprising:
causing a communication session involving a communication client registered to a user account to be placed in a held state;
selecting a subset of parties registered to the user account as intended recipients of an invitation to retrieve the communication session; and
transmitting an indication of the selected subset of parties to a control entity for transmittal of said invitation to its intended recipients.

95. The method defined in claim 94, wherein the subset of parties registered to the user account comprises a plurality of communication clients registered to the user account.

96. The method defined in claim 94, wherein selecting comprises interacting with the control entity via a computer-implemented user interface.

97. The method defined in claim 94, executed at one of: a PSTN telephone, a mobile phone, a VoIP phone and a computer running a VoIP soft client.

98. The method defined in claim 94, further comprising sending a command to place said communication session in a held state.

99. The method defined in claim 94, wherein the subset of parties registered to the user account comprises the totality of communication clients registered to the user account.

100. The method defined in claim 94, wherein the subset of parties registered to the user account comprises less than the totality of communication clients registered to the user account.

101. The method defined in claim 94, wherein transmittal of said indication occurs over a media path established with the communication client.

102. The method defined in claim 101, further comprising transmitting to the control entity an indication of termination of said media path.

103. The method defined in claim 102, wherein receipt of said indication of termination of said media path by the control entity allows engaging of at least one of the intended recipients in the communication session.

104. The method defined in claim 94, wherein said invitation causes a perceptible effect at each of the intended recipients.

105. The method defined in claim 104, wherein said perceptible effect comprises at least one of a ringing sound, a voiceband message output over a speaker, a visual effect, a flashing or blinking indicator and a vibration.

106. The method defined in claim 94, further comprising transmitting a command to cause the communication session to be placed in a held state.

107. The method defined in claim 106, further comprising transmitting an indication of a maximal amount of time that the communication session is allowed to persist in the held state.

108. The method defined in claim 107, wherein said command comprises the indication of the maximal amount of time.

109. A memory for storing data for access by computer-readable instructions being executed on a computer, comprising a data structure including information regarding a set of communication sessions placed in a held state, said information for each particular one of the communications sessions including a customer associated with the particular communication session and an indication of a party to the particular communication session prior to its having been placed in a held state.

110. The memory defined in claim 109, wherein the information regarding each particular one of the communications sessions further includes an indication of a maximal amount of time that the particular communication session is allowed to persist in a held state.

111. The memory defined in claim 110, wherein the information regarding each particular one of the communications sessions further includes an indication of one or more parties authorized to retrieve the communication session from a held state.

112. A method, comprising:
consulting a memory in an attempt to identify at least one communication client registered to a user account to which is registered a party with which a communication session has been previously established, the communication session having been placed in a held state;
sending an invitation to retrieve the communication session to a first communication client that is one of the at least one communication client registered to the user account; and
engaging the first communication client in the communication session upon receipt of an indication of an intent to communicate using the first communication client.

113. The method defined in claim 112, wherein said first communication client comprises one of a PSTN telephone, a mobile phone, a VoIP phone and a computer running a VoIP soft client.

114. The method defined in claim 112, further comprising receiving a command to place the communication session in a held state.

115. The method defined in claim 114, further comprising placing the communication session in a held state in response to receipt of said command.

116. The method defined in claim 115, wherein said command comprises an identification of the communication session.

117. The method defined in claim 116, wherein said command is received from said party.

118. The method defined in claim 117, wherein said command is in band or in parallel with the communication session.

119. The method defined in claim 114, wherein said command comprises a paging message issued by said party.

120. The method defined in claim 112, wherein the invitation has multiple intended recipients.

121. The method defined in claim 120, wherein sending the invitation occurs in response to receipt of a paging message issued by said party.

122. The method defined in claim 120, wherein said multiple intended recipients include a plurality of communication clients registered to said user account.

123. The method defined in claim 122, further comprising receiving an indication of said multiple intended recipients.

124. The method defined in claim 123, further comprising interacting with said party to receive the indication of said multiple intended recipients.

125. The method defined in claim 124, wherein the multiple intended recipients include the first communication client.

126. The method defined in claim 121, wherein receipt of said paging message occurs over a media path established with said party.

127. The method defined in claim 126, further comprising receiving an indication of termination of said media path.

128. The method defined in claim 127, wherein receipt of said indication of termination of said media path follows said sending of the invitation.

129. The method defined in claim 128, wherein said engaging is conditional upon receipt of said indication of termination.

130. The method defined in claim 112, wherein the invitation is instrumental in causing a perceptible effect at the first communication client.

131. The method defined in claim 130, wherein said perceptible effect is an audible effect.

132. The method defined in claim 130, wherein said causing a perceptible effect at the first communication client comprises causing the first communication client to ring.

133. The method defined in claim 130, wherein said causing a perceptible effect at the first communication client comprises causing a voiceband message to be output over a speaker associated with the first communication client.

134. The method defined in claim 130, wherein said perceptible effect is a visual effect.

135. The method defined in claim 134, wherein said visual effect is achieved by a flashing or blinking indicator.

136. The method defined in claim 130, wherein said causing a perceptible effect at the first communication client comprises causing the first communication client to vibrate.

137. A non-transitory computer-readable medium comprising computer-readable program code which, when interpreted by a computing apparatus, causes the computing apparatus to execute a method, the computer-readable program code comprising:

first computer-readable program code for causing the computing apparatus to consult a memory in an attempt to identify at least one communication client registered to a user account to which is registered a party with which a communication session has been previously established, the communication session having been placed in a held state;

second computer-readable program code for causing the computing apparatus to send an invitation to retrieve the communication session to a first communication client that is one of the at least one communication client registered to the user account; and third computer-readable program code for causing the computing apparatus to engage the first communication client in the communication session upon receipt of an indication of an intent to communicate using the first communication client.

\* \* \* \* \*